(12) United States Patent
Lee et al.

(10) Patent No.: US 12,308,493 B2
(45) Date of Patent: May 20, 2025

(54) METHOD OF CONTROLLING FUEL CELL

(71) Applicants: Hyundai Motor Company, Seoul (KR); Kia Corporation, Seoul (KR)

(72) Inventors: Jung Jae Lee, Whasung-Si (KR); Dae Jong Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 405 days.

(21) Appl. No.: 17/890,915

(22) Filed: Aug. 18, 2022

(65) Prior Publication Data
US 2023/0054074 A1 Feb. 23, 2023

(30) Foreign Application Priority Data
Aug. 20, 2021 (KR) .................. 10-2021-0109815

(51) Int. Cl.
*H01M 8/04537* (2016.01)
*H01M 8/0432* (2016.01)
*H01M 8/04492* (2016.01)
*H01M 8/04955* (2016.01)

(52) U.S. Cl.
CPC ... *H01M 8/04604* (2013.01); *H01M 8/04365* (2013.01); *H01M 8/04492* (2013.01); *H01M 8/04559* (2013.01); *H01M 8/04589* (2013.01); *H01M 8/04955* (2013.01); *H01M 2250/20* (2013.01)

(58) Field of Classification Search
CPC ....... H01M 16/006; H01M 2008/1095; H01M 2250/20; H01M 8/0432; H01M 8/04365; H01M 8/04492; H01M 8/04559; H01M 8/04589; H01M 8/04701; H01M 8/04753; H01M 8/0488; H01M 8/0491; H01M 8/04955; H01M 8/04992; Y02E 60/50
See application file for complete search history.

(56) References Cited

U.S. PATENT DOCUMENTS 9,385,380 B2 7/2016 Blanchet et al.
2021/0135257 A1* 5/2021 Jung .................... B60L 3/0053

FOREIGN PATENT DOCUMENTS

| JP | 5168814 B2 | 3/2013 |
|---|---|---|
| KR | 10-1230900 B1 | 2/2013 |
| KR | 10-1404403 B1 | 6/2014 |
| KR | 10-20170051235 A | 5/2017 |
| KR | 10-20190137462 A | 12/2019 |

OTHER PUBLICATIONS

Machine translation KR20140036668A (Year: 2014).*

* cited by examiner

*Primary Examiner* — Victoria H Lynch
(74) *Attorney, Agent, or Firm* — Morgan, Lewis & Bockius LLP

(57) ABSTRACT

A method of controlling a fuel cell includes collecting, by a control unit, environmental information and state information of a fuel cell stack; determining, by the control unit, a motor output offset value from the collected environmental information and the collected state information of the fuel cell stack; correcting, by the control unit, a default critical output corresponding to a current vehicle operating state based on the determined motor output offset value; determining, by the control unit, the stop or the restart of the fuel cell by comparing a motor output demand determined from current vehicle operating information with the corrected critical output; and controlling, by the control unit, an operating state of the fuel cell to become a state of the determined stop or restart.

18 Claims, 10 Drawing Sheets

METHOD OF CONTROLLING FUEL CELL

CROSS-REFERENCE TO RELATED APPLICATION

The present application claims priority to Korean Patent Application No. 10-2021-0109815 filed on Aug. 20, 2021, the entire contents of which is incorporated herein for all purposes by this reference.

BACKGROUND OF THE PRESENT DISCLOSURE

Field of the Present Disclosure

The present disclosure relates to a method of controlling a fuel cell, and more particularly, to a method of controlling a fuel cell, which may maintain a proper operating temperature of a fuel cell, maintain a more improved stack performance by reducing the frequency of occurrence of flooding phenomenon or dry phenomenon caused by overcooling and overheating of the fuel cell, and improve winter starting performance and achieve optimization of an operation of the fuel cell.

Description of Related Art

Fuel cells are a power generation device configured to convert chemical energy of a fuel into electrical energy by electrochemically reacting a fuel gas and an oxidizer gas. The fuel cells are widely used not only for industrial, home, and vehicle power supplies, but also for supplying power to small electric/electronic products and portable devices.

As fuel cells for vehicles, polymer electrolyte membrane fuel cells with high power density are the most studied. The polymer electrolyte membrane fuel cells use hydrogen as a fuel gas and oxygen or air containing oxygen as an oxidizer gas.

The fuel cell may include a plurality of cells configured to generate electrical energy by reacting the fuel gas and the oxidizer gas, and is generally used in a stack form in which a plurality of cells is stacked and connected in series to satisfy a required output level.

As the fuel cell mounted on a vehicle also requires a high output, hundreds of cells configured to individually generate electrical energy are stacked in a stack form to satisfy the requirement. As described above, a cell assembly in which a plurality of cells are stacked and connected is referred to as a fuel cell stack.

A cell of a polymer electrolyte membrane fuel cell includes a membrane electrode assembly with catalyst electrode layers attached to both sides of the membrane centered on a polymer electrolyte membrane through which hydrogen ions move, a gas diffusion layer configured to supply a fuel gas and an oxidizer gas, which are reaction gases, to the membrane electrode assembly, and transmit generated electrical energy, and a separator configured to move the reaction gases and coolant.

Here, the membrane electrode assembly includes the polymer electrolyte membrane capable of moving hydrogen ions, and a cathode and an anode, which are electrode layers, configured by applying to both sides of the electrolyte membrane catalyst that allows hydrogen, which is the fuel gas, and air (or oxygen), which is the oxidizer gas, to react.

In a unit cell of the fuel cell, the gas diffusion layers configured to evenly distribute the fuel gas and the oxidizer gas are stacked at an external portion of the membrane electrode assembly, that is, external portions of the cathode and the anode, and the separator configured to supply the reaction gases to the gas diffusion layer while providing a flow path through which the reaction gases and coolant pass is located at an external portion of the gas diffusion layer.

Furthermore, a gasket configured to seal a fluid is stacked to be interposed between the parts configuring the unit cell, and the gasket may be provided in a state of being integrally molded with the membrane electrode assembly or the separator.

The fuel cell stack is configured by stacking a plurality of cells using such a configuration as the unit cell, and then coupling end plates configured to support cells to the outermost portion, and fastening the end plates and the cells together using a fastening mechanism.

A fuel cell system mounted on a fuel cell vehicle includes a fuel cell stack and devices configured to supply reaction gases to the fuel cell stack.

In other words, the fuel cell system includes the fuel cell stack configured to generate electrical energy from the electrochemical reaction of the reaction gases, a hydrogen supply device configured to supply hydrogen, which is the fuel gas, to the fuel cell stack, an air supply device configured to supply air including oxygen, which is the oxidizer gas, to the fuel cell stack, a heat and water management system configured to control the operating temperature of the fuel cell stack, and performing a heat and water management function, and a fuel cell control unit (FCU) configured to control the overall operation of the fuel cell system.

Meanwhile, when the fuel cell is restarted and stopped without considering the operating temperature and outside air temperature of the fuel cell stack, the following problems may occur.

First, a problem caused by overcooling of the fuel cell may occur. In other words, when the fuel cell is overcooled, operating efficiency may be reduced, the amount of condensed water generated in the fuel cell stack may increase, and stack performance may be temporarily reduced by the occurrence of flooding. Furthermore, there is a possibility that freezing occurs due to condensate in the fuel cell stack in winter.

Conversely, a problem due to overheating of the fuel cell may occur. In other words, when the fuel cell is overheated, operating efficiency may be reduced, and stack performance may be reduced by a dry phenomenon occurring in the fuel cell stack.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling a fuel cell, which may maintain a proper operating temperature of a fuel cell, maintain a more improved stack performance by reducing the frequency of occurrence of flooding phenomenon or dry phenomenon caused by overcooling and overheating of the fuel cell, and improve winter starting performance and achieve optimization of an operation of the fuel cell.

The object of the present disclosure is not limited to the above-described object, and other objects not mentioned will be clearly understood by those skilled in the art to which the present disclosure pertains (hereinafter, referred to as 'those skilled in the art') from the following description.

There is provided a method of controlling a fuel cell according to an exemplary embodiment of the present disclosure, the method including: collecting, by a control unit, environmental information and state information of a fuel cell stack; determining, by the control unit, a motor output offset value from the collected environmental information and the collected state information of the fuel cell stack; correcting, by the control unit, a default critical output corresponding to a current vehicle operating state based on the determined motor output offset value; determining, by the control unit, stop or restart of the fuel cell by comparing a motor demand output determined from current vehicle operating information with the corrected default critical output; and controlling, by the control unit, an operating state of the fuel cell to become a state of the determined stop or restart.

Accordingly, according to the method of controlling the fuel cell according to an exemplary embodiment of the present disclosure, it is possible to maintain a proper operating temperature of a fuel cell, maintain a more improved stack performance by reducing the frequency of occurrence of flooding phenomenon or dry phenomenon caused by overcooling and overheating of the fuel cell, and improve winter starting performance and achieve optimization of an operation of the fuel cell.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

Figure 1:
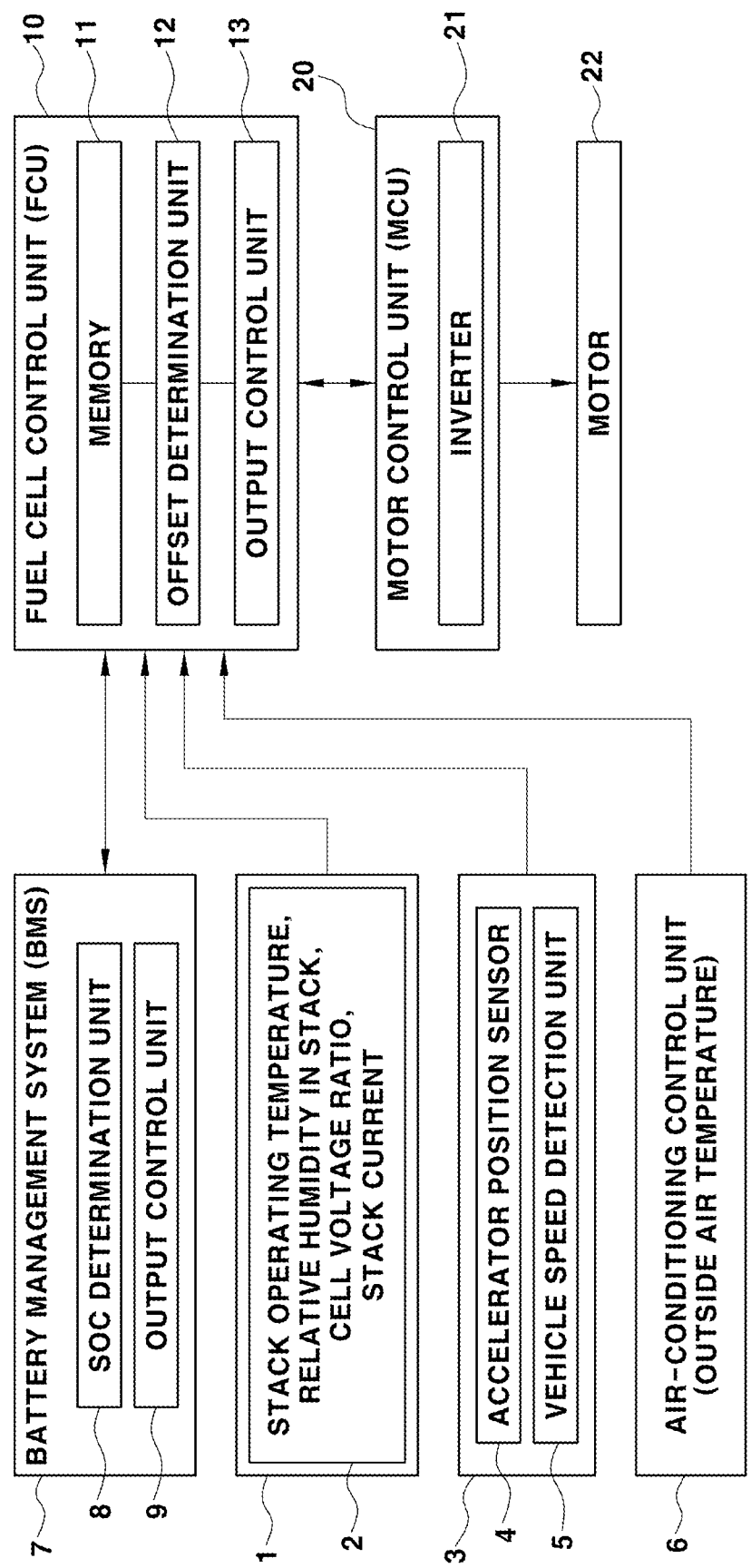
FIG. 1 is a block view showing a configuration of a system configured for performing a fuel cell control according to an exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The specific structural or functional descriptions presented in the exemplary embodiments of the present disclosure are only exemplified for describing the embodiments according to the concept of the present disclosure, and the embodiments according to the concept of the present disclosure may be embodied in various forms. Furthermore, it should not be construed as being limited to the embodiments described herein, and it should be understood to include all modifications, equivalents, and substitutes included in the spirit and technical scope of the present disclosure.

Meanwhile, in the present disclosure, terms such as first and/or second may be used to describe various components, but the components are not limited by the terms. The above terms are used only for distinguishing one component from other components, and for example, a first component may be named as a second component, and similarly, the second component may also be referred to as the first component without departing from the scope according to the concept of the present disclosure.

It should be understood that when a component is "connected to" or "coupled to" another component, the component may be directly connected or coupled to another component, but other components may exist therebetween. On the other hand, it should be understood that when a component is "directly connected to" or "in direct contact with" another component, no other components exist therebetween. Other expressions for describing the relationship between components, that is, expressions such as "between" and "directly between" or "adjacent to" and "directly adjacent to", should be construed in the same manner.

The same reference numerals refer to the same components throughout the specification. The terms used herein is for describing the embodiments, and is not intended to limit the present disclosure. In the exemplary embodiment, the singular form also includes the plural form unless specifically stated in the context. "comprises" and/or "comprising" used herein does not preclude the presence or addition of one or more other components, steps, operations, and/or elements other than the stated component, step, operation, and/or element.

Hereinafter, various embodiments of the present disclosure will be described in detail with reference to the accompanying drawings.

The present disclosure relates to a method of controlling a fuel cell, and to a method of controlling the stop and restart of a fuel cell. The present disclosure is directed to providing a method of controlling the stop and restart of a fuel cell configured for maintaining a proper operating temperature of the fuel cell. Furthermore, the present disclosure is directed to providing a method of controlling a fuel cell, which may maintain a more improved stack performance by reducing the frequency of occurrence of flooding phenomenon or dry phenomenon caused by overcooling and overheating of the fuel cell, and improve winter starting performance and achieve optimization of an operation of the fuel cell.

To the present end, in the present disclosure, environmental information and state information of the fuel cell stack are monitored, and the stop and restart control of the fuel cell stack is performed based on the monitored environmental information and state information of the fuel cell stack. The present disclosure is characterized in that the stop or the restart of the fuel cell stack is determined by determining a motor output offset value using the environmental information and the state information of the fuel cell stack, and then reflecting the determined motor output offset value to correct a set critical output value, and comparing the corrected critical output value with a motor demand output.

In the following description, the fuel cell may be understood as having the same meaning as a fuel cell stack, and it will be easily understood by those skilled in the art that the operation, stop, and start (including restart) of the fuel cell mean operations, stops, and starts of the fuel cell system and the fuel cell stack.

Furthermore, unless specifically determined otherwise in the following description, an output may mean power P, and for example, outputs such as a motor output, a motor demand output, a batter output, and a fuel cell output may mean power.

FIG. 1 is a block view showing a configuration of a system configured for performing a fuel cell control according to an exemplary embodiment of the present disclosure; As shown, a process of controlling a fuel cell according to an exemplary embodiment of the present disclosure may be performed by a control unit, in particular, a fuel cell control unit (FCU) 10. The fuel cell control unit 10 is provided to receive environmental information and stack state information collected from a vehicle in real time to perform a fuel cell control according to an exemplary embodiment of the present disclosure. The stack state information is state information obtained for a fuel cell stack 1 in real time, and may include a stack operating temperature, a relative humidity (RH) in the stack, a cell voltage ratio (FcRV), and a stack current.

In the present disclosure, the stack state information may be obtained by a state information acquisition unit 2, and the state information obtained for the fuel cell stack 1 by the state information acquisition unit 2 is input to the fuel cell control unit 10. Among the state information of the fuel cell stack, the stack operating temperature may be a temperature of coolant having passed through the fuel cell stack 1, which may be detected by a water temperature sensor. Furthermore, a stack current among the state information of the fuel cell stack may be detected by a current sensor.

Furthermore, the relative humidity (RH) in the stack may be a value estimated based on information collected from a fuel cell system. At the instant time, information such as a flow rate of air supplied to the fuel cell stack 1, a pressure measured by a pressure sensor, the amount of water generated in proportion to a current value measured by a current sensor, and the amount of water discharged corresponding to the amount of water may be used to estimate the relative humidity in the stack. The relative humidity in the fuel cell stack is a control variable already used in the fuel cell control, and an estimating method thereof is a technical matter already known to those skilled in the art, and thus a detailed description thereof will be omitted.

The cell voltage ratio (FcRV) among the state information of the fuel cell stack is a value obtained by dividing a minimum cell voltage by an average cell voltage, which means that a voltage of the cell including the minimum voltage is very low as the cell voltage ratio is small, so that the probability of cell omission may be high. Typically, the fuel cell stack 1 is composed of hundreds of unit cells. Furthermore, in the fuel cell stack 1 for a vehicle, a cell voltage is measured and monitored by a stack voltage monitor (SVM), and the present cell voltage is used to monitor individual cell performance of the fuel cell stack.

Furthermore, in the present disclosure, the fuel cell control unit (FCU) 10 may receive an outside air temperature as the environmental information in real time, and at the instant time, the fuel cell control unit 10 may receive the outside air temperature detected through an air-conditioning control unit 6 in real time. As the environmental information, the outside air temperature of the environment in which the fuel cell vehicle and the fuel cell system are operated is detected by an outside air temperature sensor provided in a vehicle, and the fuel cell control unit 10 may receive and use the outside air temperature detected by the outside air temperature sensor from the air-conditioning control unit 6 in real time.

In the present disclosure, the fuel cell control unit (FCU) 10 performs a cooperative control for the fuel cell control and the motor control with a battery management system (BMS) 7, a motor control unit (MCU) 20, and the air-conditioning control unit 6, and to the present end, the fuel cell control unit 10 is communicatively connected to the battery management system 7, the motor control unit 20, and the air-conditioning control unit 6.

In the present disclosure, the fuel cell control unit 10 includes a memory 11 configured to store the state information of the fuel cell obtained and input by the state information acquisition unit 2, an offset determination unit 12 configured to determine a motor output offset (A) value used to correct a critical output value based on the state information of the fuel cell stack, and an output control unit 13 configured to correct the critical output value with reference to the motor output offset (A) value determined by the offset determination unit 12 and determine the stop or the restart of the fuel cell using the corrected critical output value.

Here, a motor 22 is a motor for the vehicle traveling, that is, a drive motor configured to drive a vehicle. The drive and output control of the motor 22 are performed by the cooperative control of the fuel cell control unit 10 and the motor control unit 20. Furthermore, the critical output value in the output control unit 13 is used to determine the stop and restart of the fuel cell from the motor demand output.

In the configuration of the fuel cell control unit 10, the memory 11 stores data of the stack operating temperature, the relative humidity (RH) in the stack, the cell voltage ratio (FcRV), and the stack current obtained and received by the state information acquisition unit 2 of the fuel cell stack in real time. At a same time, the memory 11 stores environmental information received from the air-conditioning control unit 6, outside air temperature data in real time.

The offset determination unit 12 of the fuel cell control unit 10 determines the motor output offset value from the outside air temperature which is the environmental information, and the stack operating temperature, the relative humidity (RH) in the fuel cell stack, the stack current, and the cell voltage ratio (FcRV) that are the state information of the fuel cell stack, and the output control unit 13 of the fuel cell control unit 10 corrects the critical output value for determining the stop and restart of the fuel cell using the determined motor output offset (A) value.

The output control unit 13 of the fuel cell control unit 10 determines the stop or the restart of the fuel cell by comparing the motor demand output determined from the operating information of a vehicle with the post-correction critical output corrected using the motor output offset value, and stops or restarts the operation of the fuel cell according to the determination results thereof.

At the present time, the output control unit 13 of the fuel cell control unit 10 compares the motor demand output with the post-correction critical output corresponding to a current vehicle speed. Furthermore, the output control unit 13 of the fuel cell control unit 10 communicates with the battery management system 7 and the motor control unit 20 for stopping or restarting the fuel cell to perform the cooperative control for controlling the battery output and the motor output.

When the fuel cell is stopped, the output control unit 13 of the fuel cell control unit 10 drives the motor 22 only with an output of a battery through the cooperative control with the battery management system (BMS) 7 and the motor control unit (MCU) 20 so that a vehicle travels in an electric vehicle (EV) mode. On the other hand, when the fuel cell is restarted, the output control unit 13 of the fuel cell control unit 10 drives the motor 22 with the output of the fuel cell stack 1 through the cooperative control with the motor control unit (MCU) 20 so that a vehicle travels in a fuel cell (FC) mode.

The battery is a battery used as a high-voltage power source together with the fuel cell stack 1 in a vehicle, and is a general high-voltage battery (main battery) mounted on the vehicle, and when the fuel cell stack 1 in a vehicle is a main power source for operating the motor 22 and an in-vehicle load, the battery may be an auxiliary power source.

The battery is connected to the motor 22 and the in-vehicle load in parallel with the fuel cell stack 1 in a vehicle. Like the fuel cell stack 1, the battery is provided to apply DC power to the motor 22 through an inverter 21. Furthermore, the battery is provided to store the power generated by the fuel cell stack 1 and the regenerative power by the motor 22, and although not shown in the drawing, the battery may be connected to the motor 22 through the inverter 21 to be chargeable or dischargeable.

A general fuel cell vehicle is provided with the battery management system (BMS) 7 configured to collect battery state information and perform a control for managing a battery state while being in charge of a battery charging and discharging (output) control. Here, the battery state information may include state of charge (hereinafter, referred to as 'SOC') information representing the remaining capacity of the high-voltage battery along with the voltage, current, and temperature of the high-voltage battery. To the present end, the battery management system 7 includes an SOC determination unit 8 configured to determine and monitor a battery SOC, and furthermore, includes an output control unit 9 configured to control the battery output (power, P).

In the present disclosure, the output control unit 13 of the fuel cell control unit 10 is communicatively connected to the output control unit 9 of the battery management system 7, and the output control unit 13 of the fuel cell control unit 10 and the output control unit 9 of the battery management system 7 perform the cooperative control for controlling the battery output.

Furthermore, the output control unit 13 of the fuel cell control unit 10 determines the stop or the restart of the fuel cell using the motor demand output, the current vehicle speed, the motor output offset ($\Delta P$), and the critical output determined from driving information collected from a vehicle, and performs the EV mode control for traveling a vehicle by driving the motor 22 only with the battery output after stopping the operation of the fuel cell stack 1 when the stop of the fuel cell is determined. At the instant time, the output control unit 13 of the fuel cell control unit (FCU) 10 performs the cooperative control for the EV mode traveling with the battery management system 7 and the motor control unit (MCU) 30.

On the other hand, the output control unit 13 of the fuel cell control unit 10 restarts the operation of the fuel cell stack 1 by operating the fuel cell system, and then performs the FC mode control for traveling a vehicle by driving the motor 22 only with the output of the fuel cell stack 1 when determining the restart of the fuel cell in a state in which the fuel cell stops. At the instant time, the output control unit 13 of the fuel cell control unit (FCU) 10 drives the motor 22 with the output of the fuel cell stack 1 to perform the cooperative control with the motor control unit (MCU) 30 so that a vehicle travels.

The present disclosure has no difference from the related art in that when the motor demand output is determined based on the operating information collected from a vehicle, the in-vehicle controllers, that is, the fuel cell control unit (FCU) 10, the battery management system 7, and the motor control unit (MCU) 30 perform the cooperative control based on the determined motor demand output to drive and control the motor 22 with the outputs of the fuel cell stack 1 or the battery.

However, the present disclosure is characterized in that the critical output is corrected by use of the motor output offset value determined from the stack operating temperature and the outside air temperature, and then the motor demand output is compared with the corrected critical output to determine the stop or restart of the fuel cell.

The motor control unit 20 includes the inverter 21 configured to drive and control the motor 22 with power generated by the fuel cell or the battery power, and communicates with the output control unit 13 of the fuel cell control unit 10 in real time to perform the cooperative control for controlling the output of the motor 22 and the vehicle speed.

In the present disclosure, the operating information for determining the motor demand output may be detected by an operating information detection unit 3, and the operating information detection unit 3 may include an accelerator position sensor (APS) 4. Furthermore, the operating information detection unit 3 may further include a vehicle speed detection unit 5 configured to detect the current vehicle speed.

In the present disclosure, the vehicle operating information for determining the motor demand output may include driver accelerator pedal input value information, in which the driver accelerator pedal input value information is detected by the accelerator position sensor (APS) 4.

In the exemplary embodiment, the operating information collected from a vehicle for determining the motor demand output, and a process or method of determining the motor demand output from the operating information are known technical matters, and thus a detailed description thereof will be omitted.

Hereinafter, a method of determining the motor output offset (Δ) value for correcting the critical output in the offset determination unit 12 of the fuel cell control unit 10 will be described in detail.

In the present disclosure, the motor output offset (Δ) value is determined from values of four types of offset factors (α, β, γ, δ) selectively obtained according to the outside air temperature and the stack operating temperature. Here, the four types of the offset factors include a first offset factor (α) and a second offset factor (β) separately obtained according to the outside air temperature, and a third offset factor (γ) and a fourth offset factor (δ) separately obtained according to the stack operating temperature. Each of the offset factors is determined by each offset map in the fuel cell control unit 10.

Figure 2:
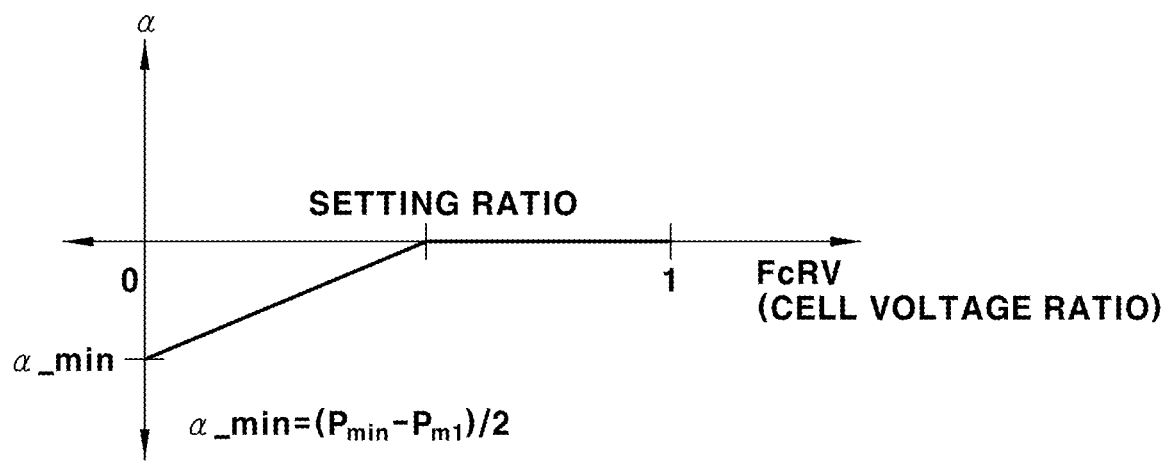
FIG. 2 is a view showing an offset map that determines a value of a first offset factor in the present disclosure.
Figure 3:
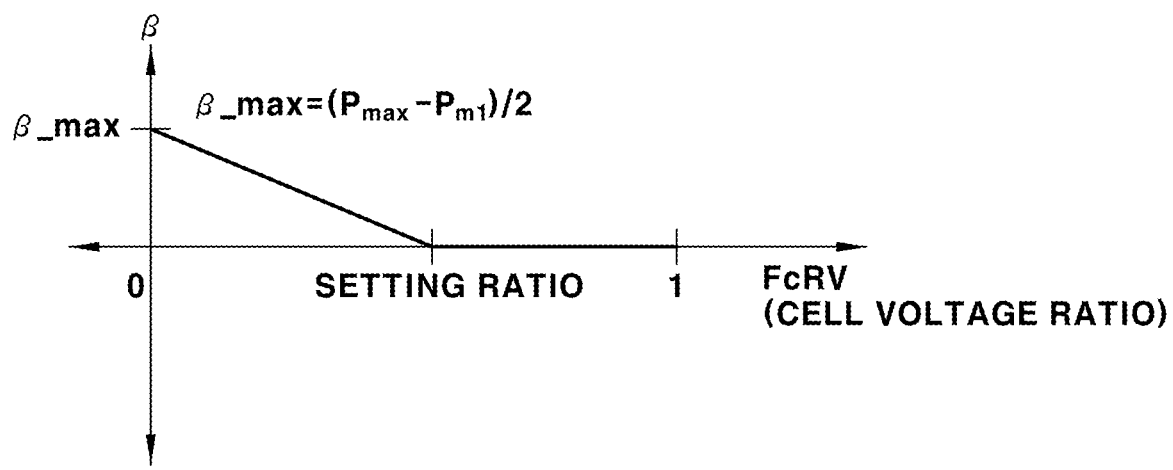
FIG. 3 is a view showing an offset map that determines a value of a second offset factor in the present disclosure.
Figure 4:
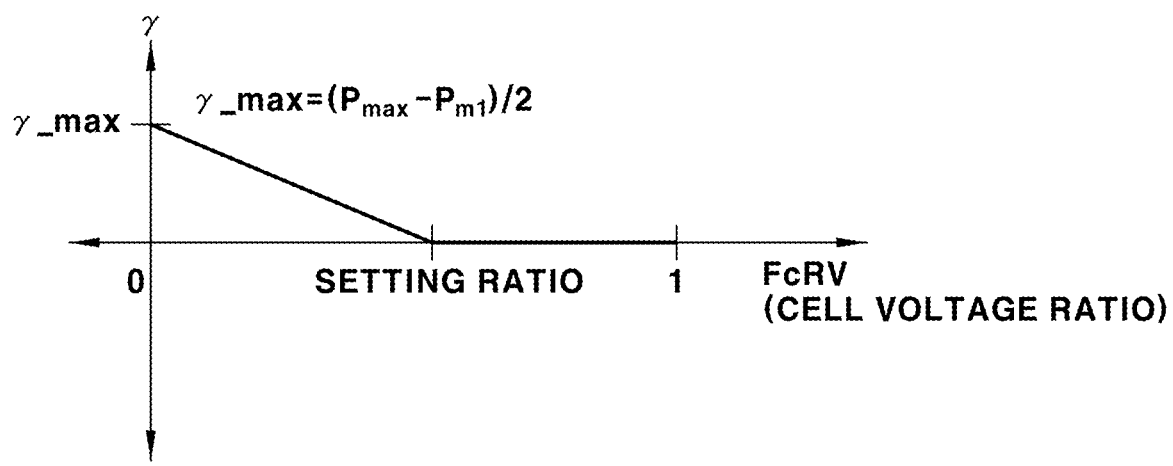
FIG. 4 is a view showing an offset map that determines a value of a third offset factor in the present disclosure.
Figure 5:
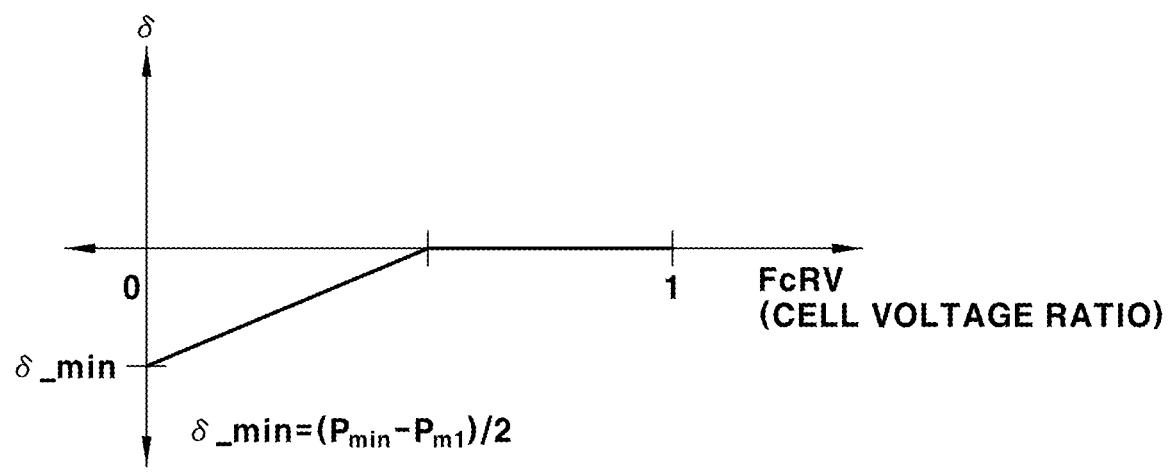
FIG. 5 is a view showing an offset map that determines a value of a fourth offset factor in the present disclosure.

FIG. 2 shows an offset map that determines a value of the first offset factor (α), FIG. 3 shows an offset map that determines a value of the second offset factor (β), FIG. 4 shows an offset map that determines a value of a third offset factor (γ), and FIG. 5 shows an offset map that determines a value of the fourth offset factor (δ). In FIG. 2, 'α' indicates the first offset factor, in FIG. 3, 'β' indicates the second offset factor, in FIG. 4, 'γ' indicates the third offset factor, and in FIG. 5, 'δ' indicates the fourth offset factor.

In the present disclosure, one of the first offset factor (α) and the second offset factor (β) is selectively obtained from the offset map classified according to the outside air temperature, and one of the third offset factor (γ) and the fourth offset factor (δ) is selectively obtained from the offset map classified according to the stack operating temperature. FIG. 2, FIG. 3, FIG. 4 and FIG. 5 are views showing an offset map that determines each offset factor.

Accordingly, in the present disclosure, an actual motor output offset (Δ) value is determined from one of the first offset factor (α) and the second offset factor (β), and one of the third offset factor (γ) and the fourth offset factor (δ). At the instant time, the actual motor output offset (Δ) value may be determined by the sum of one of the first offset factor (α) and the second offset factor (β), and one of the third offset factor (γ) and the fourth offset factor (δ).

Alternatively, when the value of the first offset factor (α) is obtained by the offset map according to the outside air temperature, the value of the second offset factor (β) may be set to zero, and conversely, when the value of the offset factor (β) is obtained by the offset map according to the outside air temperature, the value of the first offset factor (α) may be set to zero. Likewise, when the value of the third offset factor (γ) is obtained by the offset map according to the stack operating temperature, the value of the fourth offset factor (δ) may be set to zero, and conversely, when the value of the fourth offset factor (δ) is obtained by the offset map according to the stack operating temperature, the value of the third offset factor (γ) may be set to zero. At the instant time, the actual motor output offset (Δ) value may be determined by a value of the sum of all values of the first offset factor (α), the second offset factor (β), the third offset factor (γ), and the fourth offset factor (δ) ($\Delta P = \alpha + \beta + \gamma + \delta$).

Furthermore, in the present disclosure, the value of each corresponding offset factor may be zero or may be determined as a map value of the offset map according to the relative humidity (RH) in the stack and the stack current in addition to the outside air temperature and the stack operating temperature. Furthermore, the offset map may be a map prepared so that each offset factor (α, β, γ, δ) is determined as a value according to the cell voltage ratio (FcRV) among the state information of the fuel cell stack.

In other words, the offset map is a map in which the values of the offset factors (α,β,γ,δ) according to the cell voltage ratio (FcRV) are set, that is, a map that defines the relationship between the cell voltage ratio and the offset factors as setting data which is stored and used in the memory 11 of the fuel cell control unit 10 so that the values of the offset factors (α,β,γ,δ) may be determined from the current cell voltage ratio (FcRV) in real time.

In the corresponding offset map, the first offset factor (α) is set to zero or a negative (−) value, and the second offset factor (β) is set to zero or a positive (+) value (see FIG. 2 and FIG. 3). Furthermore, in the corresponding offset map, the third offset factor (γ) is set to zero or a positive (+) value, and the fourth offset factor (δ) is set to zero or a negative (−) value (see FIG. 4 and FIG. 5). of course, the value of each offset factor is set to a value corresponding to the cell voltage ratio (FcRV) when it has a negative (−) value or a positive (+) value other than zero as described above. At the instant time, as shown in FIG. 2, FIG. 3, FIG. 4 and FIG. 5, the value of each of the offset factors (α, β, γ, δ) in a non-zero section is set to be proportional to the cell voltage ratio (FcRV).

Furthermore, as shown in FIG. 2, the value of the first offset factor (α) may be set to a larger value (i.e., an absolute value of the first offset factor has a smaller value) in proportion thereto as the value of the cell voltage ratio (FcRV) is larger in the non-zero section. As shown in FIG. 3, the value of the second offset factor (β) may be set to a smaller value in proportion thereto as the value of the cell voltage ratio (FcRV) increases in the non-zero section.

At the present time, in the offset map shown in FIG. 2, the first offset factor (α) is determined as a value greater than a minimum value (a min) and smaller than zero. Here, the value of a min may be determined as a value of ½ of a value obtained by subtracting a pre-correction default critical output ($P_{m1}$) from a minimum value ($P_{min}$) of the critical output to be described later ($\alpha\_min = P_{min} - P_{m1})/2$). Here, the minimum value ($P_{min}$) of the critical output is a value predetermined in the fuel cell control unit 10.

Furthermore, in the offset map shown in FIG. 3, the second offset factor (β) is determined as a value smaller than a maximum value (β_max) and greater than zero. Here, the value of β_max may be determined as a value of ½ of the value obtained by subtracting the pre-correction default critical output ($P_{m1}$) from a maximum value ($P_{max}$) of the critical output to be described later ($\beta\_max = P_{max} - P_{m1})/2$). Here, the maximum value ($P_{max}$) of the critical output is a value predetermined in the fuel cell control unit 10.

As shown in FIG. 4, the value of the third offset factor (γ) may be set to a smaller value in proportion thereto as the value of the cell voltage ratio (FcRV) increases in the non-zero section. As shown in FIG. 5, the value of the fourth offset factor (δ) may be set to a larger value (i.e., an absolute value of the fourth offset factor is a smaller value) in proportion thereto as the value of the cell voltage ratio (FcRV) increases in the non-zero section.

Furthermore, in the offset map shown in FIG. 4, the third offset factor (γ) is determined as a value smaller than a maximum value (γ_max) and greater than zero, in which a value of γ_max may be determined as a value of ½ of a value obtained by subtracting the pre-correction default critical output ($P_{m1}$) from the maximum value ($P_{max}$) of the critical output to be described later (γ_max=$P_{max}$−$P_{m1}$)/2).

Furthermore, in the offset map shown in FIG. 5, the fourth offset factor (δ) is determined as a value greater than a minimum value of δ_min and smaller than zero, in which a value of δ_min may be determined as a value of ½ of a value obtained by subtracting the pre-correction default critical output ($P_{m1}$) from the minimum value ($P_{min}$) of the critical output to be described later (δ_min=$P_{min}$−$P_{m1}$)/2).

Figure 10:
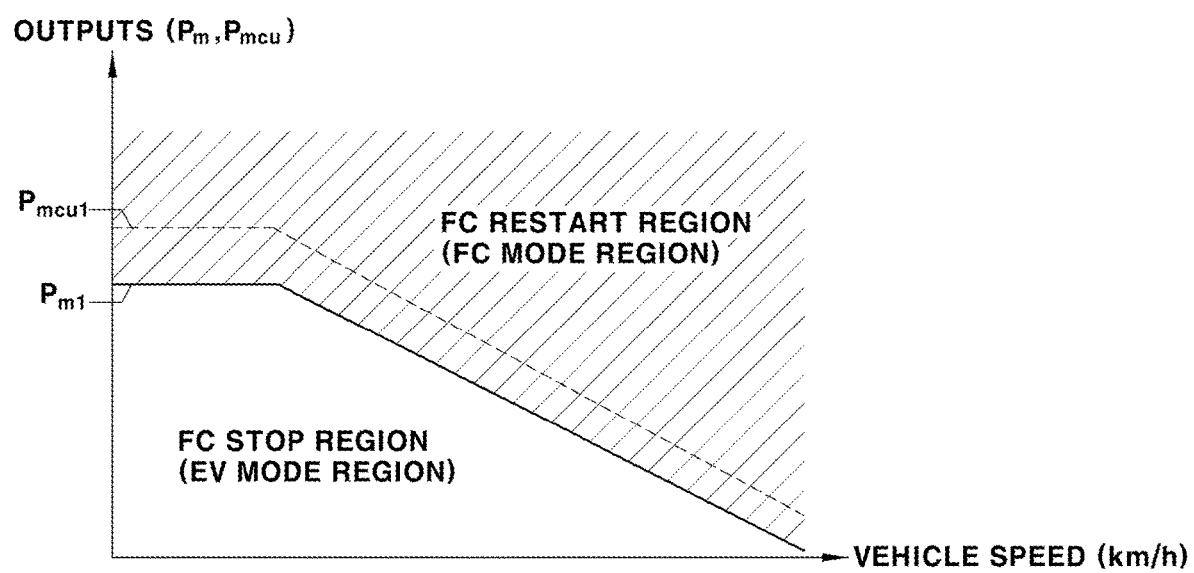
FIG. 10 is a view showing a map which may be used to determine the stop and restart of the fuel cell in a general fuel cell vehicle.
Figure 12:
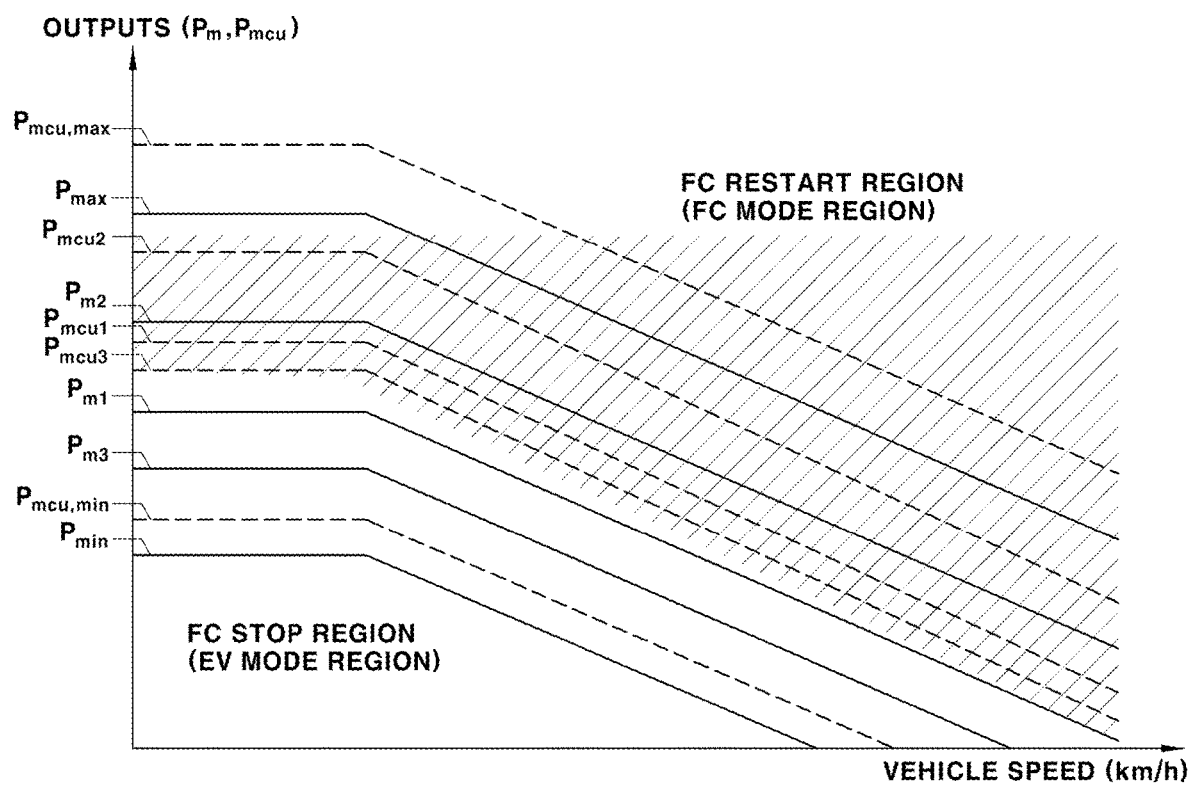
FIG. 12 is a view showing a default critical output and a post-correction critical output in the present disclosure.

All of the minimum value ($P_{min}$) and maximum value ($P_{max}$) of the critical output, and the default critical output ($P_{m1}$) are determined as corresponding values according to the current vehicle speed detected by the vehicle speed detection unit 5 of the driving information detection unit 3, and may be determined by a map or an equation from the vehicle speed (see FIGS. 10 and 12).

Although it has been described that the offset map in which the value of each offset factor is preset as the value corresponding to the cell voltage ratio as described above is used as the setting data for determining the value of each offset factor (α,β,γ,δ) from the cell voltage ratio (FcRV), but an equation in which the value of each offset factor may be determined by use of the cell voltage ratio as an input may also be used as the setting data, instead of the offset map.

Hereinafter, describing the offset factor in more detail, in the offset determination unit 12 of the fuel cell control unit 10, one of the first offset factor (α) and the second offset factor (β) is selectively determined and used according to the outside air temperature, which is the environmental information, and the value of the first offset factor (α) is determined from the offset map under the low condition in which the outside air temperature is lower than a first set temperature (e.g., 15° C.), and a value of the second offset factor (β) is determined from the offset map under the high condition in which the outside air temperature is higher than the first set temperature.

In the low condition in which the outside air temperature is lower than the first set temperature, the motor output offset and the critical output value are decreased to increase an operating time of the fuel cell. By increasing the operating time of the fuel cell as described above, it is possible to prevent a reduction in the stack performance due to the occurrence of overcooling and flooding of the fuel cell while maintaining the operating temperature of the fuel cell. At the instant time, an operating time of the battery may be reduced to highly maintain the battery SOC, improving the start (cold start) performance of the fuel cell in winter. Upon cold start, the fuel cell stack is warmed-up and driven by the output of the battery until the fuel cell operates normally, so that the higher the battery SOC, the more advantageous.

On the other hand, in the high condition in which the outside air temperature is lower than the first set temperature, the motor output offset and the critical output value are increased to reduce the operating time of the fuel cell. As described above, by reducing the operating time of the fuel cell, it is possible to increase the operating time of the battery to maintain the operating temperature of the fuel cell, and prevent a reduction in stack performance due to the occurrence of overheating and drying of the fuel cell. However, when the battery SOC is reduced to a specific value or less due to an increase in the operating time of the battery, the above logic that reduces the operating time of the fuel cell by increasing the motor output offset value may be set not to be applied.

Furthermore, in the high condition in which the stack operating temperature is higher than or equal to a second set temperature (e.g., 70° C.), the motor output offset and the critical output value are increased to reduce the operating time of the fuel cell. As described above, by reducing the operating time of the fuel cell, it is possible to increase the operating time of the battery to maintain the operating temperature of the fuel cell, and prevent a reduction in stack performance due to the occurrence of overheating and drying of the fuel cell. However, when the battery SOC is reduced to a specific value or less due to an increase in the operating time of the battery, the above logic that reduces the operating time of the fuel cell by increasing the motor output offset value may be set not to be applied.

On the other hand, in the low condition in which the stack operating temperature is lower than or equal to a third set temperature (e.g., 50° C.), the motor output offset and the critical output value are decreased to increase the operating time of the fuel cell. As described above, by increasing the operating time of the fuel cell, it is possible to prevent the reduction in stack performance due to the overcooling and flooding of the fuel cell while maintaining the operating temperature of the fuel cell.

In the following description, a method of selectively determining the offset factor determined according to the outside air temperature and the stack operating temperature, and finally determining the value of the offset factor by checking the relative humidity (RH) in the fuel cell stack, the stack current, and the stack performance will be described. Here, checking the stack performance means checking the cell voltage ratio (FcRV).

Figure 6:
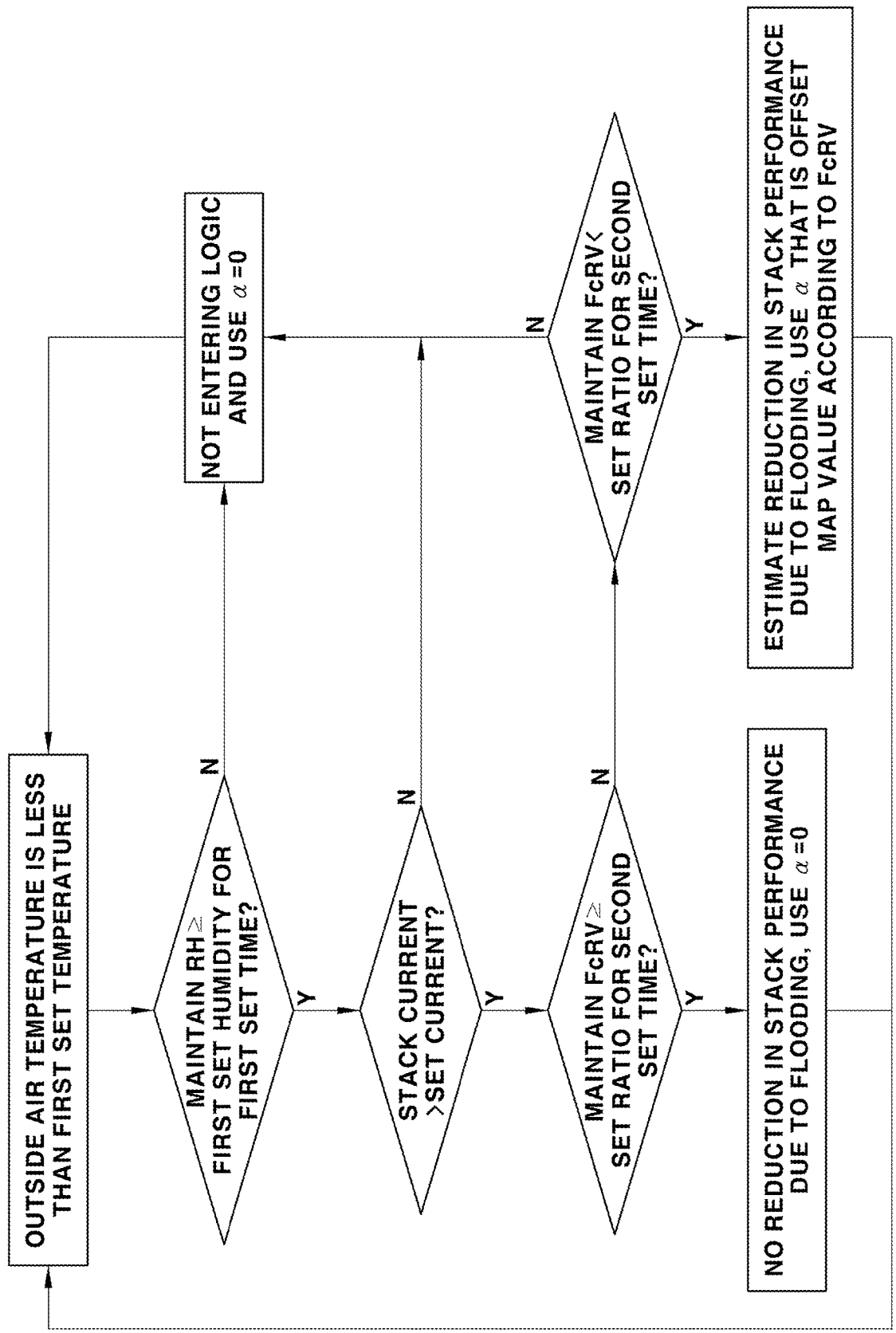
FIG. 6 is a flowchart showing a process of determining the value of the first offset factor in the present disclosure.

FIG. 6 is a flowchart showing a process of determining the value of the first offset factor (α) in the present disclosure. The lower the outside air temperature, the larger the likelihood of the occurrence of flooding and the occurrence of condensate freezing in the stack.

As shown in FIG. 6, when the outside air temperature is less than the first set temperature (e.g., 15° C.), the value of the first offset factor (α) is determined and used, and at the instant time, the value of the first offset factor (α) is determined as zero or a map value corresponding to the cell voltage ratio (FcRV).

First, when the outside air temperature is less than the first set temperature (15° C.), it is checked whether a state in which the relative humidity (RH) in the stack is greater than or equal to a predetermined first set humidity (e.g., 70%) is maintained for a first set time (e.g., 3 seconds). At the instant time, when the state in which the relative humidity (RH) in the stack is greater than or equal to a predetermined first set humidity is maintained for the first set time, it is checked whether the stack current exceeds a predetermined set current (e.g., 50 A).

Here, when the stack current exceeds the set current, it is checked whether the state in which the cell voltage ratio (FcRV) is greater than or equal to the set ratio (e.g., 0.8) value is maintained for a second set time (e.g., 3 seconds). At the instant time, when the state in which the cell voltage ratio (FcRV) is greater than or equal to the set ratio (e.g., 0.8) value is maintained for a second set time, it is determined that there is no reduction in stack performance due to flooding, so that the value of the first offset factor ($\alpha$) is determined as zero.

On the other hand, in the above process, when the state in which the relative humidity in the fuel cell stack is less than the first set humidity (70%) or greater than or equal to the first set humidity is maintained only for less than the first set time (3 seconds), and when the stack current is smaller than or equal to the set current (50 A), the process does not enter the logic and the value of the first offset factor ($\alpha$) is determined as zero. Under the stack low current control, there is a possibility of cell voltage non-uniformity due to a low flow rate control, and thus a low current region is excluded from the offset application.

Furthermore, when the state in which the cell voltage ratio (FcRV) is less than the set ratio value (0.8) is maintained for the second set time (3 seconds), it is determined that the reduction in stack performance due to flooding has occurred to determine a value corresponding to the current cell voltage ratio (FcRV) in the offset map as the value of the first offset factor ($\alpha$). In other words, the value of the first offset factor ($\alpha$) corresponding to the current cell voltage ratio (FcRV) is determined from the offset map shown in FIG. 2, and at the instant time, the value of the first offset factor ($\alpha$) may be determined as a value greater than a min and less than zero.

When the motor output offset value ($\Delta P$) is determined by reflecting the thus determined first offset factor ($\alpha$), and then the determined offset value ($\Delta P$) is used to determine the stop and restart of the fuel cell, it is possible to increase the operation of the fuel cell while decreasing the operation of the battery, induce the removal of flooding through air supply, and induce the stack operating temperature to be increased and maintained to a proper temperature (50° C. to 70° C.).

Furthermore, when the state in which the cell voltage ratio (FcRV) is greater than or equal to the set ratio (0.8) is maintained only for less than the second set time (3 seconds), or the state in which the cell voltage ratio (FcRV) is less than the set ratio (0.8) is maintained only for less than the second set time (3 seconds), the process does not enter the logic, and the value of the first offset factor ($\alpha$) is determined as zero.

Figure 7:
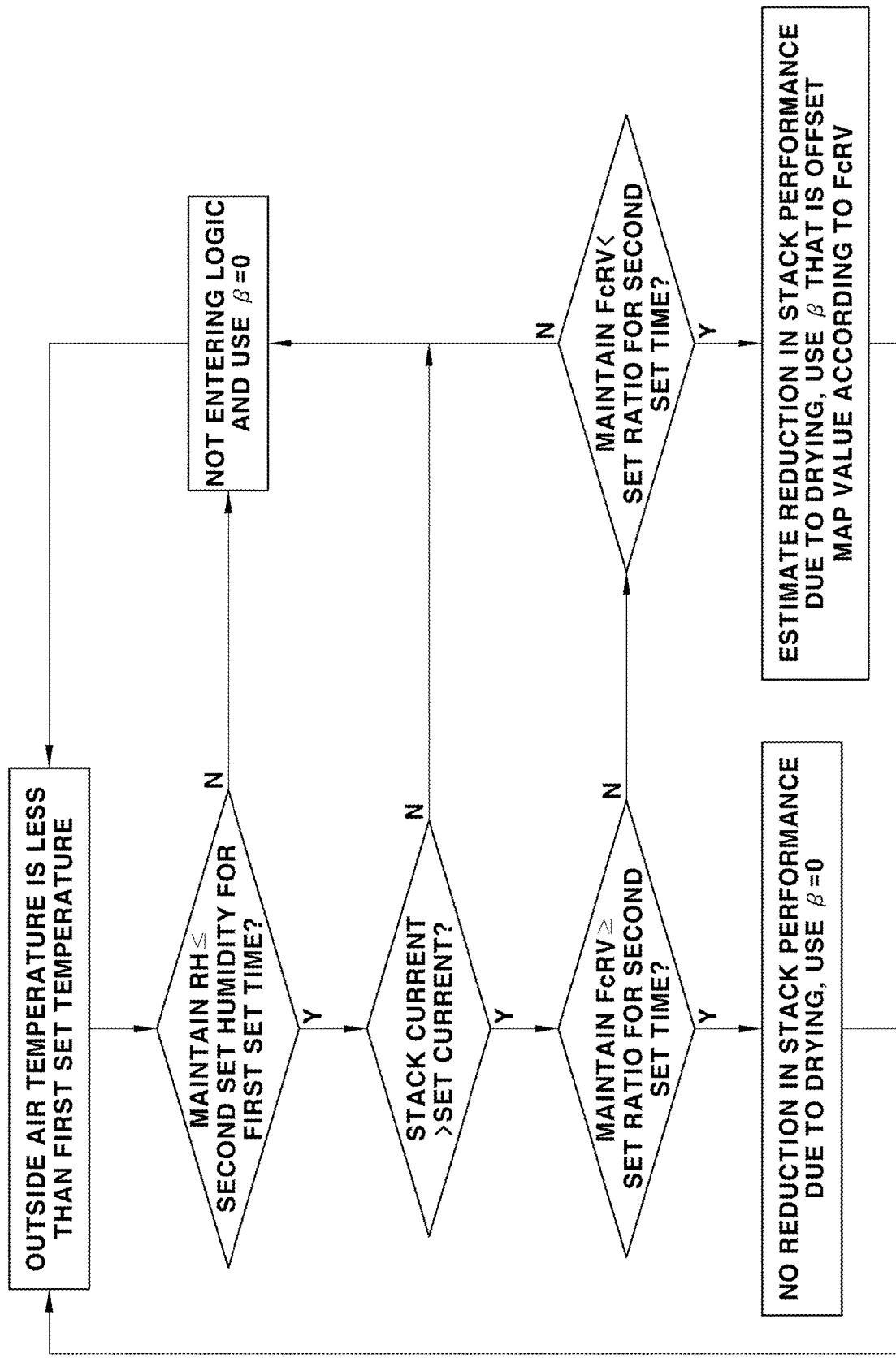
FIG. 7 is a flowchart showing a process of determining the value of the second offset factor in the present disclosure.

Next, FIG. 7 is a flowchart showing a process of determining the value of the second offset factor ($\beta$) in the present disclosure. The higher the outside air temperature, the larger the possibility of occurrence of drying.

As shown in FIG. 7, when the outside air temperature is greater than or equal to the first set temperature (e.g., 15° C.), the value of the second offset factor ($\beta$) is determined and used, and at the instant time, the value of the second offset factor ($\beta$) is determined as zero or a map value corresponding to the cell voltage ratio (FcRV).

First, when the outside air temperature is greater than or equal to the first set temperature (15° C.), it is checked whether the state in which the relative humidity (RH) in the stack is smaller than or equal to the predetermined second set humidity (e.g., 30%) is maintained for the first set time (e.g., 3 seconds). At the instant time, when the state in which the relative humidity (RH) in the stack is smaller than or equal to the second set humidity is maintained for the first set time, it is checked whether the stack current exceeds the predetermined set current (e.g., 50 A).

Here, when the stack current exceeds the set current, it is checked whether the state in which the cell voltage ratio (FcRV) is greater than or equal to the set ratio (e.g., 0.8) value is maintained for a second set time (e.g., 3 seconds). At the instant time, when the state in which the cell voltage ratio (FcRV) is greater than or equal to the set ratio (0.8) value is maintained for the second set time, it is determined that there is no reduction in stack performance due to drying, and the value of the second offset factor ($\beta$) is determined as zero.

On the other hand, in the above process, when the relative humidity in the fuel cell stack exceeds the second set humidity (30%) or the state in which the relative humidity in the fuel cell stack is smaller than or equal to the second set humidity is maintained only for less than the first set time (3 seconds), and when the stack current is smaller than or equal to the set current (50 A), the process does not enter the logic, and the value of the second offset factor ($\beta$) is determined as zero. Under the stack low current control, there is a possibility of cell voltage non-uniformity due to a low flow rate control, and thus a low current region is excluded from the offset application.

Furthermore, when the state in which the cell voltage ratio (FcRV) is less than the set ratio value (0.8) is maintained for the second set time (3 seconds), it is determined that the reduction in stack performance due to drying has occurred to determine the value corresponding to the current cell voltage ratio (FcRV) in the offset map as the value of the second offset factor ($\beta$). In other words, the value of the second offset factor ($\beta$) corresponding to the current cell voltage ratio (FcRV) is determined from the offset map shown in FIG. 3, and at the instant time, the value of the second offset factor ($\beta$) may be determined as the value smaller than $\beta\_max$ and greater than zero.

When the motor output offset value ($\Delta P$) is determined by reflecting the thus determined second offset factor ($\beta$), and then the determined offset value ($\Delta P$) is used to determine the stop and restart of the fuel cell, it is possible to decrease the operation of the fuel cell while increasing the operation of the battery, induce the removal of drying and the recovery of stack performance by decreasing the operation of the fuel cell, and induce the stack operating temperature to be maintained to a proper temperature (50° C. to 70° C.) by decreasing the stack operating temperature.

Furthermore, when the state in which the cell voltage ratio (FcRV) is greater than or equal to the set ratio (0.8) is maintained only for less than the second set time (3 seconds), or the state in which the cell voltage ratio (FcRV) is less than the set ratio (0.8) is maintained only for less than the second set time (3 seconds), the process does not enter the logic, and the value of the second offset factor ($\beta$) is determined as zero.

Figure 8:
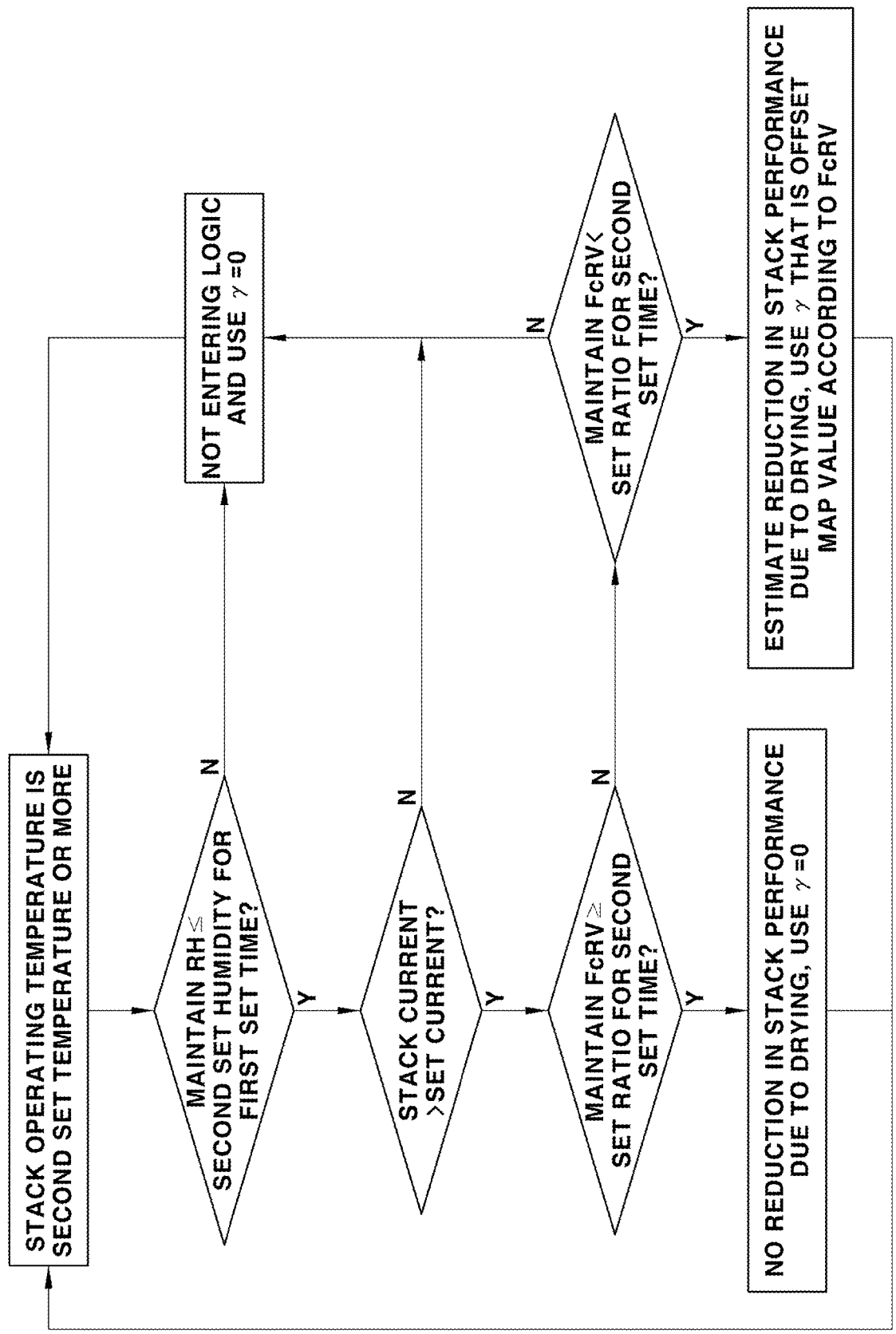
FIG. 8 is a flowchart showing a process of determining the value of the third offset factor in the present disclosure.

Next, FIG. 8 is a flowchart showing a process of determining the value of the third offset factor ($\gamma$) in the present disclosure. When the stack operating temperature is high, the possibility of occurrence of dryness increases.

As shown in FIG. 8, when the stack operating temperature is greater than or equal to the second set temperature (e.g., 70° C.), the value of the third offset element ($\gamma$) is determined and used, and at the instant time, the value of the third offset element ($\gamma$) is determined as zero or a map value corresponding to the cell voltage ratio (FcRV).

First, when the stack operating temperature is greater than or equal to the second set temperature (70° C.), it is checked whether the state in which the relative humidity (RH) in the stack is smaller than or equal to the second set humidity (e.g., 30%) is maintained for the first set time (e.g., 3 seconds). At the instant time, when the state in which the relative humidity (RH) in the stack is smaller than or equal to the second set humidity is maintained for the first set time, it is checked whether the stack current exceeds the predetermined set current (e.g., 50 A).

Here, when the stack current exceeds the set current, it is checked whether the state in which the cell voltage ratio (FcRV) is greater than or equal to the set ratio (e.g., 0.8) value is maintained for a second set time (e.g., 3 seconds). At the instant time, when the state in which the cell voltage ratio (FcRV) is greater than or equal to the set ratio (0.8) value is maintained only for the second set time (3 seconds), it is determined that there is no reduction in stack performance due to drying, and the value of the third offset factor ($\gamma$) is determined as zero.

On the other hand, in the above process, when the relative humidity in the fuel cell stack exceeds the second set humidity (30%) or the state in which the relative humidity in the fuel cell stack is smaller than or equal to the second set humidity is maintained only for less than the first set time (3 seconds), and when the stack current is smaller than or equal to the set current (50 A), the process does not enter the logic, and the value of the third offset factor ($\gamma$) is determined as zero. Under the stack low current control, there is a possibility of cell voltage non-uniformity due to a low flow rate control, and thus a low current region is excluded from the offset application.

Furthermore, when the state in which the cell voltage ratio (FcRV) is less than the set ratio value (0.8) is maintained for the second set time (3 seconds), it is determined that the reduction in stack performance due to drying has occurred to determine the value corresponding to the current cell voltage ratio (FcRV) as the value of the third offset factor ($\gamma$). In other words, the value of the third offset factor ($\gamma$) corresponding to the current cell voltage ratio (FcRV) is determined from the offset map shown in FIG. 4, and at the instant time, the value of the third offset factor ($\gamma$) may be determined as a value smaller than $\gamma\_max$ and greater than zero.

When the motor output offset value ($\Delta P$) is determined by reflecting the thus determined third offset factor ($\gamma$), and then the determined offset value ($\Delta P$) is used to determine the stop and restart of the fuel cell, it is possible to decrease the operation of the fuel cell while increasing the operation of the battery, induce the removal of drying and the recovery of stack performance by decreasing the operation of the fuel cell, and induce the stack operating temperature to be maintained to a proper temperature (50° C. to 70° C.) by decreasing the stack operating temperature.

Furthermore, when the state in which the cell voltage ratio (FcRV) is greater than or equal to the set ratio (0.8) is maintained only for less than the second set time (3 seconds), or the state in which the cell voltage ratio (FcRV) is less than the set ratio (0.8) is maintained only for less than the second set time (3 seconds), the process does not enter the logic, and the value of the third offset factor ($\gamma$) is determined as zero.

Figure 9:
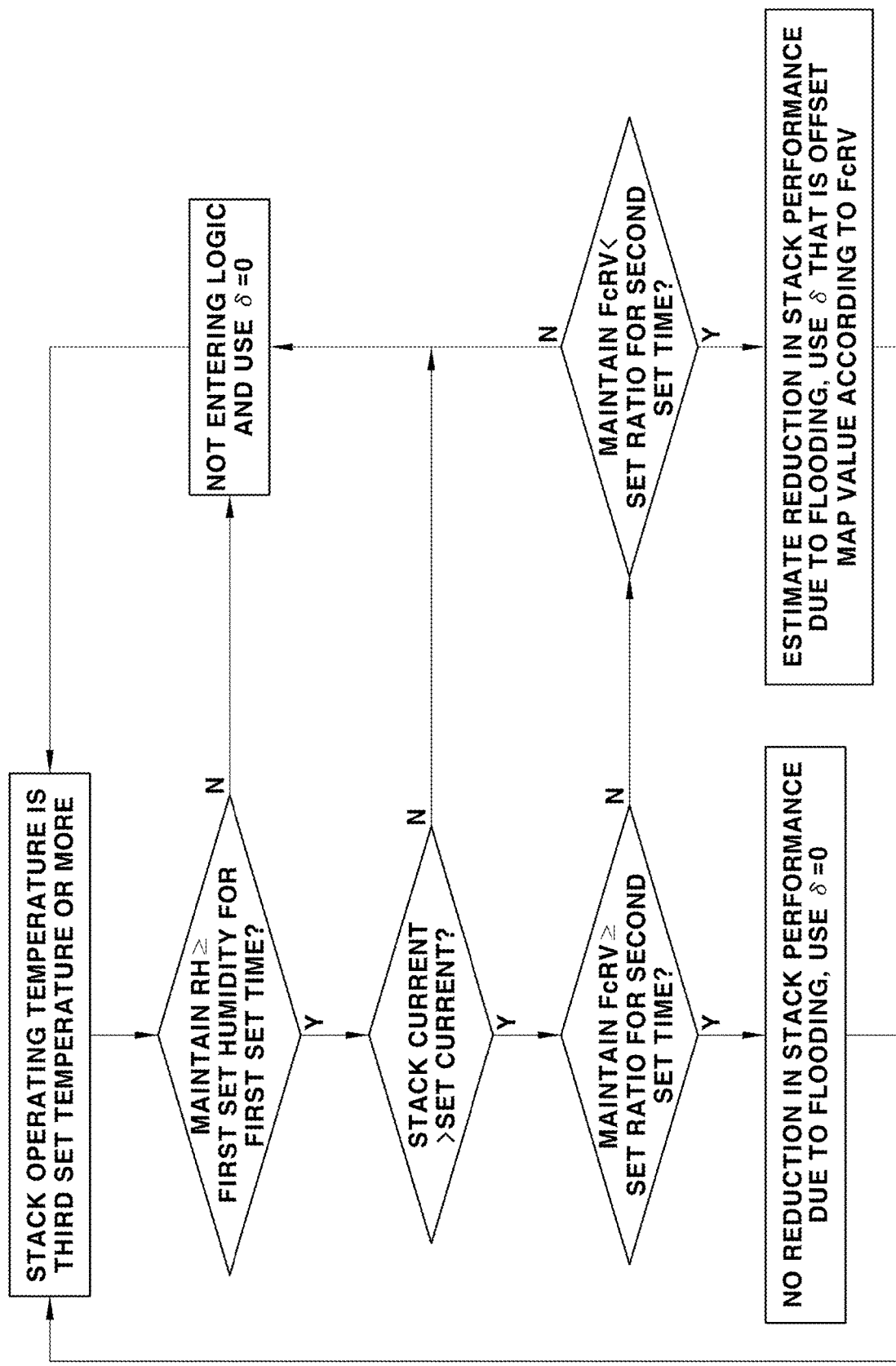
FIG. 9 is a flowchart showing a process of determining the value of the fourth offset factor in the present disclosure.

FIG. 9 is a flowchart showing a process of determining the value of the fourth offset factor ($\delta$) in the present disclosure. When the stack operating temperature is low, the possibility of occurrence of flooding increases.

As shown in FIG. 9, when the outside air temperature is smaller than or equal to the third set temperature (e.g., 50° C.), the value of the fourth offset factor ($\delta$) is determined and used, and at the instant time, the value of the fourth offset factor ($\delta$) is determined as zero or a map value corresponding to the cell voltage ratio (FcRV).

First, when the stack operating temperature is smaller than or equal to the third set temperature (e.g., 50° C.), it is checked whether the state in which the relative humidity (RH) in the stack is greater than or equal to the predetermined first set humidity (e.g., 70%) is maintained for the first set time (e.g., 3 seconds). At the instant time, when the state in which the relative humidity (RH) in the stack is greater than or equal to the first set humidity is maintained for the first set time, it is checked whether the stack current exceeds a predetermined set current (e.g., 50 A).

Here, when the stack current exceeds the set current, it is checked whether the state in which the cell voltage ratio (FcRV) is greater than or equal to the set ratio (e.g., 0.8) value is maintained for a second set time (e.g., 3 seconds). At the instant time, when the state in which the cell voltage ratio (FcRV) is greater than or equal to the set ratio (0.8) value is maintained for the second set time, it is determined that there is no reduction in stack performance due to flooding, and the value of the fourth offset factor ($\delta$) is determined as zero.

On the other hand, in the above process, when the relative humidity in the fuel cell stack is less than the first set humidity (70%) or the state above the first set humidity is maintained only for less than the first set time (3 seconds), and when the stack current is smaller than or equal to the set current (50 A), the process does not enter the logic, and the value of the fourth offset factor ($\delta$) is determined as zero. Under the stack low current control, there is a possibility of cell voltage non-uniformity due to a low flow rate control, and thus a low current region is excluded from the offset application.

Furthermore, when the state in which the cell voltage ratio (FcRV) is less than the set ratio value (0.8) is maintained for the second set time (3 seconds), it is determined that the reduction in stack performance due to flooding has occurred to determine the value corresponding to the current cell voltage ratio (FcRV) in the offset map as the value of the fourth offset factor ($\delta$). In other words, the value of the fourth offset factor ($\delta$) corresponding to the current cell voltage ratio (FcRV) is determined from the offset map shown in FIG. 5, and at the instant time, the value of the fourth offset factor ($\delta$) may be determined as the value greater than $\delta\_min$ and smaller than zero.

When the motor output offset value ($\Delta P$) is determined by reflecting the thus determined fourth offset factor ($\delta$), and then the determined offset value ($\Delta P$) is used to determine the stop and restart of the fuel cell, it is possible to increase the operation of the fuel cell while decreasing the operation of the battery, induce the removal of flooding through air supply, and induce the stack operating temperature to be increased and maintained to a proper temperature (50° C. to 70° C.).

Furthermore, when the state in which the cell voltage ratio (FcRV) is greater than or equal to the set ratio (0.8) is maintained only for less than the second set time (3 seconds), or the state in which the cell voltage ratio (FcRV) is less than the set ratio (0.8) is maintained only for less than the second set time (3 seconds), the process does not enter the logic, and the value of the fourth offset factor ($\delta$) is determined as zero.

The process and method of obtaining the values of the offset factors ($\alpha$, $\beta$, $\gamma$, $\delta$) that meet the current conditions with reference to the outside air temperature, the stack operating temperature, the relative humidity (RH) in the fuel cell stack, the stack current, and the cell voltage ratio (FcRV) have been described above.

As described above, when the values of the offset factors that meet the current conditions are obtained, the actual motor output offset ($\Delta P$) value is determined by use of the values of the offset factors, and the motor output offset is determined as the value obtained by summing all values of the obtained offset factors. In other words, the motor output offset (ΔP) may be defined as 'ΔP=α+β+γ+δ'.

Meanwhile, FIG. 10 is a view showing a map which may be used to determine the stop and restart of the fuel cell in the general fuel cell vehicle. As may be seen from FIG. 10, in the general fuel cell vehicle, a map in which the critical output is set to the operating state of a vehicle, for example, a value according to a vehicle speed (km/h) is input and stored in the fuel cell control unit 10 in advance and used to determine the stop and restart of the fuel cell.

Referring to FIG. 10, it may be seen that a region in which the motor demand outputs ($P_m$, $P_{mcu}$) are greater than or equal to critical outputs ($P_{m1}$, $P_{mcu1}$) is set as a fuel cell restart region, that is, a fuel cell (FC) mode region. Furthermore, it may be seen that a region in which the motor demand outputs ($P_m$, $P_{mcu}$) are smaller than the critical outputs ($P_{m1}$, $P_{mcu1}$) is set to a fuel cell stop region, that is, an EV mode region.

Conventionally, the current motor demand outputs ($P_m$, $P_{mcu1}$) are determined from the vehicle operating information obtained by the operating information detection unit 3 in the traveling vehicle, and the critical outputs ($P_{m1}$, $P_{mcu1}$) corresponding to a current vehicle speed detected by the vehicle speed detection unit 5 of the operating information detection unit 3 are determined from the map shown in FIG. 10. Subsequently, it is determined whether the fuel cell may be stopped or restarted by comparing the determined motor demand outputs with the critical output.

In other words, when the critical output corresponding to the current vehicle speed is determined from the map, by comparing the current motor demand output with the determined critical output, when the current motor demand output is less than the critical output, the fuel cell is stopped, and when the current motor demand output is greater than or equal to the critical output, the fuel cell is restarted.

Comparing the motor demand output with the critical output has been described above, in which the motor demand output may be the demand output from the motor control unit (MCU) 20, that is, an MCU demand output ($P_{mcu}$), or may be a demand output based on the motor, that is, a motor standard demand output ($P_m$).

Here, the motor reference demand output ($P_m$) is an output required based on the motor for vehicle traveling, and is the demand output considering the energy transfer efficiency (η, η<1) of the motor and a reducer to the MCU demand output ($P_{mcu}$), and the relationship between the motor standard demand output ($P_m$) and the MCU demand output ($P_{mcu}$) is as shown in Equation 1 below.

$$P_m = P_{mcu} \times \eta \quad \text{Equation 1}$$

This is also applied to the critical output to be described later. In other words, motor critical outputs ($P_{m1}$, $P_{m2}$, $P_{m3}$) may be values obtained by multiplying MCU critical outputs ($P_{mcu1}$, $P_{mcu2}$, $P_{mcu3}$) by the energy transfer efficiency (ii).

As a result, conventionally, when the motor standard demand output ($P_m$) is used as the motor demand output to be able to determine the stop or restart of the fuel cell, the motor critical output ($P_{m1}$) as the critical output is preset in the map as a value according to the vehicle speed (km/h).

Accordingly, when the motor standard demand output ($P_m$) is determined from the operating information while the vehicle travels, the fuel cell control unit 10 compares the motor standard demand output ($P_m$) with the motor critical output ($P_{m1}$) on the map corresponding to the current vehicle speed to determine the stop or restart of the fuel cell.

Here, when the motor standard demand output ($P_m$) is greater than or equal to the motor critical output ($P_{m1}$) determined from the map ($P_m \geq P1$), the fuel cell control unit 10 is configured to control a vehicle to travel in the fuel cell (FC) mode by maintaining the operating state (start state) of the fuel cell or restarting the fuel cell.

On the other hand, when the motor standard demand output ($P_m$) is smaller than the motor critical output ($P_{m1}$) ($P_m < P_{m1}$), the fuel cell control unit 10 is configured to control a vehicle to travel in the EV mode by maintaining the fuel cell in a stop state or stopping the fuel cell when it is in an operating state (start state).

Alternatively, when the MCU demand output ($P_{mcu}$) is used as the motor demand output to determine the stop or restart of the fuel cell, the MCU critical output ($P_{mcu1}$) as the critical output is preset as a value according to the vehicle speed (km/h) on the map.

In the instant case, when the MCU demand output ($P_{mcu}$) is greater than or equal to the MCU critical output ($P_{mcu1}$) ($P_{mcu} \geq P_{mcu1}$), the fuel cell control unit 10 is configured to control a vehicle to travel in the FC mode by maintaining the operating state (start state) of the fuel cell or restarting the fuel cell, and conversely, when the MCU demand output ($P_{mcu}$) is smaller than the MCU critical output ($P_{mcu1}$) ($P_{mcu} < P_{mcu1}$), the fuel cell control unit 10 is configured to control a vehicle to travel in the EV mode by maintaining the fuel cell in a stop state or stopping the fuel cell.

As described above, in the EV mode, a vehicle travels by driving the motor 22 with the output of the high-voltage battery, and in the FC mode, a vehicle travels by generating the output of the high-voltage battery in consideration of a drive time of an air supply device, such as a compressor, configured to supply air to the fuel cell stack 1 and then driving the motor 22 with the output of the fuel cell stack 1.

As described above, conventionally, the stop and restart of the fuel cell are determined by comparing the motor demand output with the critical output. However, unlike the convention, in the present disclosure, the fuel cell control unit 10 corrects and then utilizes the critical output for determining the stop and restart of the fuel cell using the motor output offset (ΔP) value.

Figure 11:
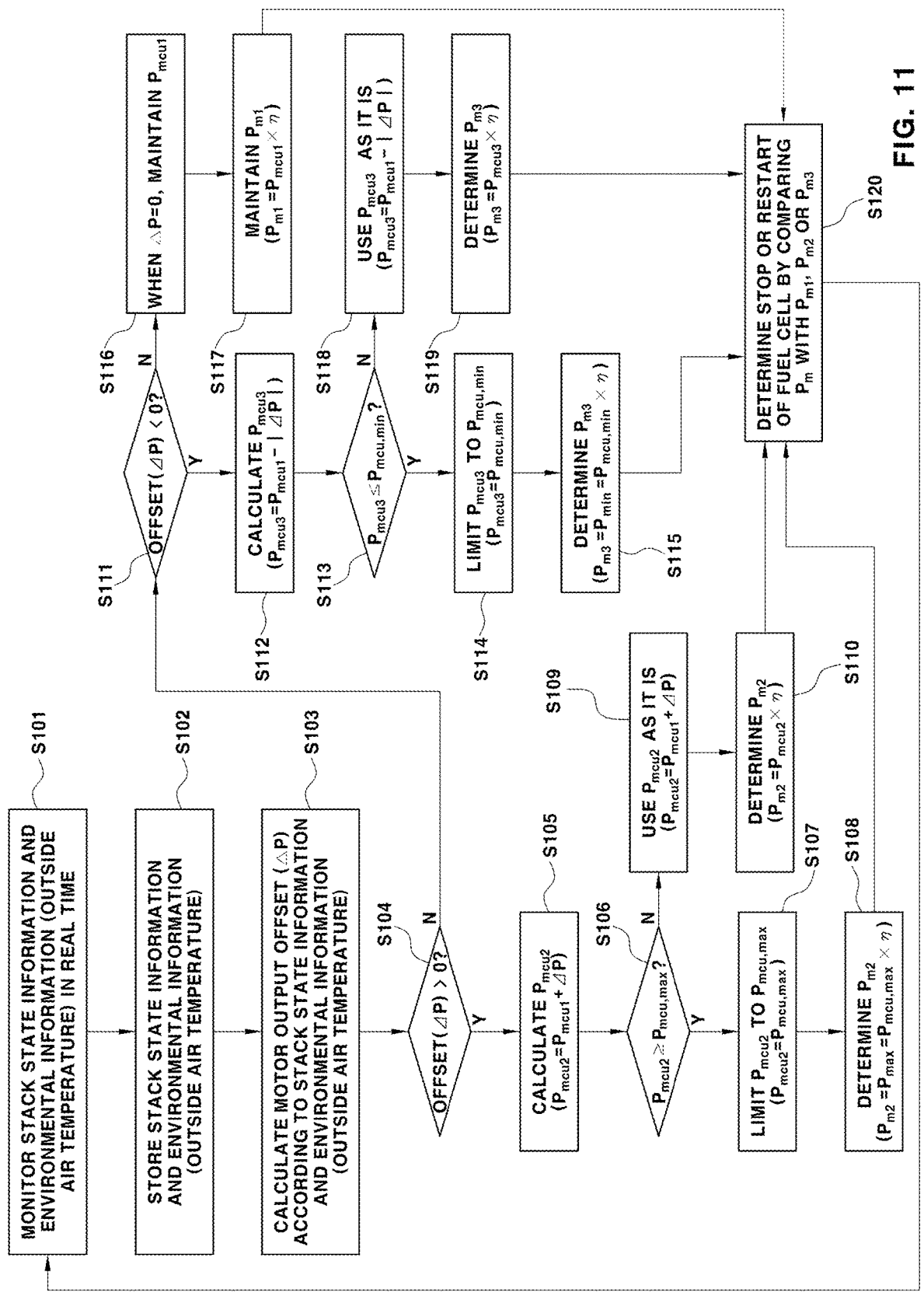
FIG. 11 is a flowchart showing a process of controlling the fuel cell according to an exemplary embodiment of the present disclosure.

FIG. 11 is a flowchart showing a process of controlling the fuel cell according to an exemplary embodiment of the present disclosure, and shows the entire process of determining the stop or restart of the fuel cell.

Hereinafter, in the exemplary embodiment, a uncorrected critical output, that is, an existing critical output preset as a value according to the vehicle speed on the map as described above, will be referred to as 'a default critical output'. Furthermore, when the default critical output is further subdivided, the existing uncorrected motor critical output is referred to as 'a default motor critical output ($P_{m1}$)', and the existing uncorrected MCU critical output is referred to as 'a default MCU critical output ($P_{mcu1}$)'.

First, the environmental information and the state information of the fuel cell stack collected from the vehicle are monitored in real time (S101), and the environmental information and the state information of the fuel cell stack are received from the fuel cell controller 10 in real time and stored in the memory 11 (S102). As described above, the environmental information includes the outside air temperature detected by an outside air temperature sensor and input to the fuel cell control unit 10 through the air-conditioning control unit 6, and the state information of the fuel cell stack includes the real-time stack operating temperature, relative humidity (RH) in the stack, stack current, and cell voltage ratio (FcRV), which are obtained and input by the state information acquisition unit 2 of the fuel cell stack.

The state information of the fuel cell stack may be obtained from the fuel cell stack 1 or the state information acquisition unit 2 provided in the fuel cell system and then input to the fuel cell control unit 10, but may also be directly obtained from the signals of the detection elements of the state information acquisition unit 2, for example, a sensor configured to detect a flow rate of air or a pressure, a current sensor configured to detect a stack current, a stack voltage measurement device, which are received by the fuel cell control unit 10.

Subsequently, the offset determination unit 12 of the fuel cell control unit 10 utilizes the real-time information stored in the memory 11, as described with reference to FIGS. 2 to 9, to determine the values of the offset factors ($\alpha$, $\beta$, $\gamma$, $\delta$), and then sums the determined values of the offset factors ($\alpha$, $\beta$, $\gamma$, $\delta$) to determine the motor output offset ($\Delta P$) value (S103).

At the present time, the motor output offset ($\Delta P$) value is determined based on the outside air temperature, the stack operating temperature, the relative humidity (RH) in the fuel cell stack, the stack current, and the cell voltage ratio (FcRV) so that the stop or the restart of the fuel cell may be determined in consideration of the outside air temperature and the stack operating temperature.

Furthermore, when the motor output offset ($\Delta P$) value is determined in consideration of the outside air temperature and the stack operating temperature in the offset determination unit 12 of the fuel cell control unit 10, the motor output offset ($\Delta P$) value is input to the output control unit 13 of the fuel cell control unit 10, and then the default critical output ($P_{mcu1}$) corresponding to the current vehicle speed is corrected by use of the motor output offset ($\Delta P$) in the output control unit 13.

As described above, a process of correcting the default critical output ($P_{mcu1}$) to determine the post-correction critical outputs ($P_{m2}$, $P_{m3}$) is shown as operations (S104 to S119) in FIG. 11. When the post-correction critical outputs ($P_{m2}$, $P_{m3}$) are determined, in the operation S120 of FIG. 11, the stop or the restart of the fuel cell is determined by comparing the motor demand output ($P_m$) with the value of the post-correction critical outputs ($P_{m2}$ or $P_{m3}$) corresponding to the current vehicle speed.

In other words, the output control unit 13 of the fuel cell control unit 10 corrects the default critical output ($P_{mcu1}$) using the motor output offset ($\Delta P$) to determine the corrected critical outputs, that is, the post-correction critical outputs ($P_{m2}$, $P_{m3}$). Subsequently, the output control unit 13 of the fuel cell control unit 10 is configured to control a vehicle to travel in the FC mode by comparing the motor demand output ($P_m$) with the post-correction critical output ($P_{m2}$ or $P_{m3}$) corresponding to the current vehicle speed, and at the instant time, maintaining the operating state (start state) of the fuel cell or restarting the fuel cell in a stop state when the motor demand output ($P_m$) is the post-correction critical output ($P_{m2}$ or $P_{m3}$) or more.

On the other hand, when the motor demand output ($P_m$) is less than the post-correction critical output ($P_{m2}$ or $P_{m3}$) by comparing the motor demand output ($P_m$) with the post-correction critical output ($P_{m2}$ or $P_{m3}$) corresponding to the current vehicle speed, the output control unit 13 of the fuel cell control unit 10 is configured to control a vehicle to travel in the EV mode by maintaining the fuel cell in a stop state or stopping the fuel cell in an operating state (start state). Here, the vehicle speed refers to a vehicle speed detected in real time by the vehicle speed detection unit 5 of the operating information detection unit 3.

FIG. 12 is a view showing the post-correction critical outputs ($P_{m2}$, $P_{mcu2}$, $P_{m3}$, $P_{mcu3}$) obtained by correcting the default critical output using the motor output offset ($\Delta P$) along with the default critical outputs ($P_{m1}$, $P_{mcu1}$) in the present disclosure. Furthermore, FIG. 12 shows maximum values ($P_{max}$, $P_{mcu,max}$) and minimum values ($P_{min}$, $P_{mcu,min}$) of the critical output preset in the fuel cell control unit 10.

Definitions of symbols representing outputs in FIG. 11 and FIG. 12 are as follows.

$P_{m1}$: Default motor critical output $P_{mcu1}$: Default MCU critical output $P_{m2}$, $P_{m3}$: Post-correction motor critical outputs $P_{mcu2}$, $P_{mcu3}$: Post-correction MCU critical outputs $P_{max}$: Maximum value of the post-correction motor critical output $P_{mcu,max}$: Maximum value of the post-correction MCU critical output $P_{min}$: Minimum value of the post-correction motor critical output $P_{mcu,min}$: Minimum value of the post-correction MCU critical output In the definition of the output (P) value, '$P_{m1}=P_{mcu1}\times\eta$', '$P_{m2}=P_{mcu2}\times\eta$', '$P_{m3}=P_{mcu3}\times\eta$' Furthermore, '$P_{max}=P_{mcu,max}\times\eta$', '$P_{min}=P_{mcu,min}\times\eta$'

Furthermore, $P_{m2}$ and $P_{mcu2}$ refer to the post-correction motor critical output and the post-correction MCU critical output, respectively, when the motor output offset ($\Delta P$) value is a positive (+) value ($\Delta P > 0$). Furthermore, $P_{m3}$ and $P_{mcu3}$ refer to the post-correction motor critical output and the post-correction MCU critical output, respectively, when the motor output offset ($\Delta P$) value is a negative (−) value ($\Delta P < 0$).

Here, $P_{m2}$ and $P_{mcu2}$ are determined as the values of '$P_{m2}=P_{m1}+\Delta P$' and '$P_{mcu2}=P_{mcu1}+\Delta P$' when they are smaller than the values of $P_{max}$ and $P_{mcu,max}$, respectively, and $P_{m2}$ and $P_{mcu2}$ are determined as the values of '$P_{m2}=P_{max}=P_{mcu,max}\times\eta$' and '$P_{mcu2}=P_{mcu,max}$' when they are the values of $P_{max}$ and $P_{mcu,max}$ or more, respectively.

Furthermore, $P_{m3}$ and $P_{mcu3}$ are determined as the values of '$P_{m3}=P_{m1}-|\Delta P|$' and '$P_{mcu3}=P_{mcu1}-|\Delta P|$' when they are greater than the values of $P_{min}$ and $P_{mcu,min}$, respectively, and $P_{m3}$ and $P_{mcu3}$ are determined as the values of '$P_{m3}=P_{min}=P_{mcu,min}\times\eta$' and '$P_{mcu3}=P_{mcu,min}$' when they are smaller than or equal to the values of $P_{min}$ and $P_{mcu,min}$, respectively.

Describing the correcting process in more detail, in operation S104, when the motor output offset ($\Delta P$) value is a positive (+) value ($\Delta P > 0$), the default critical output ($P_{mcu1}$) is corrected by adding the motor output offset ($\Delta P$) value to the default critical output ($P_{mcu1}$) as it is, and the value obtained by adding the motor output offset ($\Delta P$) to the default critical output ($P_{mcu1}$) becomes the post-correction critical output ($P_{mcu2}=P_{mcu1}+\Delta P$) (S105).

Subsequently, in operation S106, the post-correction critical output ($P_{mcu2}$) and the maximum value ($P_{mcu,max}$) of the critical output are compared. Here, when the value of the post-correction critical output ($P_{mcu2}$) is smaller than the maximum value ($P_{mcu,max}$) of the critical output ($P_{mcu2} < P_{mcu,max}$), the value obtained by adding the motor output offset ($\Delta P$) to the default critical output ($P_{mcu1}$) is finally determined as the post-correction critical output ($P_{mcu2}=P_{mcu1}+\Delta P$) as it is (S109).

Furthermore, when the post-correction critical output is the post-correction MCU critical output ($P_{mcu2}$), the post-correction motor critical output ($P_{m2}$) is determined by multiplying the energy transfer efficiency (η) to the post-correction MCU critical output ($P_{mcu2}$) ($P_{m2}=P_{mcu2}\times\eta$) (S110), and the stop or the restart of the fuel cell is determined by comparing the motor standard demand output ($P_m$) with the post-correction motor critical output ($P_{m2}$) corresponding to the current vehicle speed (S120).

On the other hand, in operation S106, when the value of the post-correction critical output ($P_{mcu2}$) is the maximum value ($P_{mcu,max}$) of the critical output or more ($P_{mcu2} \geq P_{mcu,max}$), the value of the post-correction critical output ($P_{mcu2}$) is limited to the maximum value ($P_{mcu,max}$), so that the maximum value ($P_{mcu,max}$) is finally determined as the value of the post-correction critical output ($P_{mcu2}$) ($P_{mcu2}=P_{mcu,max}$) (S107).

Furthermore, when the post-correction critical output is the post-correction MCU critical output ($P_{mcu2}$), the post-correction motor critical output ($P_{m2}$) is determined by multiplying the energy transfer efficiency (η) by the post-correction MCU critical output ($P_{mcu2}=P_{mcu,max}$) ($P_{m2}=P_{max}=P_{mcu,max}\times\eta$) (S108), and the stop or the restart of the fuel cell is determined by comparing the motor standard demand output ($P_m$) with the post-correction motor critical output ($P_{m2}$) corresponding to the current vehicle speed (S120).

As described above, when the critical output is corrected by adding the motor output offset (ΔP) value, which is a positive (+) value, to the default critical output (pre-correction critical output), it means that the fuel cell stop region (EV mode region) is expanded (FC mode is reduced) because the critical output is increased by the motor output offset (ΔP) value even in the same vehicle speed condition.

Meanwhile, in operation S111, when the value of the motor output offset (ΔP) is a negative (−) value (ΔP<0), the default critical output ($P_{mcu1}$) is corrected by subtracting the absolute value (|ΔP|) of the motor output offset value from the default critical output ($P_{mcu1}$), and a value obtained by subtracting the absolute value (|ΔP|) of the motor output offset value from the default critical output ($P_{mcu1}$) becomes the post-correction critical output ($P_{mcu3}=P_{mcu1}-|\Delta P|$) (S112).

Subsequently, in operation S113, the post-correction critical output ($P_{mcu3}$) and the minimum value ($P_{mcu,min}$) of the critical output are compared. Here, when the value of the post-correction critical output ($P_{mcu3}$) is greater than the minimum value ($P_{mcu,min}$) of the critical output ($P_{mcu3}>P_{mcu,min}$), the value obtained by subtracting the absolute value (|ΔP|) of the motor output offset value from the default critical output ($P_{mcu1}$) is finally determined as the post-correction critical output as it is ($P_{mcu3}=P_{mcu1}-|\Delta P|$) (S118).

Furthermore, when the post-correction critical output is the post-correction MCU critical output ($P_{mcu3}$), the post-correction motor critical output ($P_{m3}$) is determined by multiplying the energy transfer efficiency (η) to the post-correction MCU critical output ($P_{mcu3}$) ($P_{m3}=P_{mcu3}\times\eta$) (S119), and the stop or the restart of the fuel cell is determined by comparing the motor standard demand output ($P_m$) with the post-correction motor critical output ($P_{m3}$) corresponding to the current vehicle speed (S120).

On the other hand, in operation S113, when the value of the post-correction critical output ($P_{mcu3}$) is the minimum value of the critical output ($P_{mcu,min}$) ($P_{mcu3} \leq P_{mcu,min}$), the value of the post-correction critical output ($P_{mcu3}$) is limited to the minimum value ($P_{mcu,min}$), so that the minimum value ($P_{mcu,min}$) is finally determined as the value of the post-correction critical output ($P_{mcu3}$) ($P_{mcu3}=P_{mcu,min}$) (S114).

Furthermore, when the post-correction critical output is the post-correction MCU critical output ($P_{mcu3}$), the post-correction motor critical output ($P_{m3}$) is determined by multiplying the energy transfer efficiency (TO) by the post-correction MCU critical output ($P_{mcu3}=P_{mcu,min}$) ($P_{m3}=P_{min}=P_{mcu,min}\times\eta$) (S115), and the stop or the restart of the fuel cell is determined by comparing the motor standard demand output ($P_m$) with the post-correction motor critical output ($P_{m3}$) corresponding to the current vehicle speed (S120).

As described above, when the critical output is corrected by subtracting the absolute value of the motor output offset (ΔP) value, which is a negative (−) value, from the default critical output (the pre-correction critical output), it means that the restart region (FC mode region) of the fuel cell is expanded (the EV mode region is reduced) because the critical output is reduced by the absolute value of the motor output offset value even in the same vehicle speed condition.

Furthermore, when the motor output offset (ΔP) value is zero, the default critical output ($P_{mcu1},P_{m1}$, $P_{m1}=P_{mcu}\times\eta$) is maintained as it is without correction of the critical output (S116, S117), and the stop or the restart of the fuel cell is determined by comparing the motor standard demand output ($P_m$) with the default critical output ($P_{m1}$) corresponding to the current vehicle speed (S120).

As described above, in the present disclosure, the maximum value ($P_{mcu,max}$) of the critical output is set in the fuel cell control unit 10 in advance, and when the motor output offset (ΔP) value is a positive (+) value (ΔP>0), the post-correction critical output ($P_{mcu2}$) is limited to the set maximum value ($P_{mcu,max}$) ($P_{mcu2}=P_{mcu,max}$) compared to a case in which the motor demand output may not be satisfied with the high-voltage battery output when the post-correction critical output ($P_{mcu2}=P_{mcu1}+\Delta P$) is the set maximum value ($P_{mcu,max}$) or more ($P_{mcu2} \geq P_{mcu,max}$).

Likewise, the minimum value ($P_{mcu,min}$) of the critical output is set in the fuel cell control unit 10 in advance, and when the motor output offset (ΔP) value is a negative (−) value (ΔP<0), the post-correction critical output ($P_{mcu3}$) is limited to the set minimum value ($P_{mcu,min}$) ($P_{mcu3}=P_{mcu,min}$) when the post-correction critical output (($P_{mcu3}=P_{mcu1}-|\Delta P|$) is the set minimum value ($P_{mcu,min}$) or less ($P_{mcu3} \leq P_{mcu,min}$), preventing the needlessness for restarting the fuel cell at an output which is too low.

In the example of FIG. 12, when the default motor critical output ($P_{m1}$) is used as the default critical output, by applying the motor output offset (ΔP) value to the default motor critical output ($P_{m1}$) to determine the post-correction motor critical outputs ($P_{m2},P_{m3},P_{max},P_{min}$), and then comparing the motor standard demand output ($P_m$) with the post-correction motor critical outputs ($P_{m2},P_{m3},P_{max},P_{min}$), the vehicle is controlled to travel in the FC mode (restart of the fuel cell) when the motor standard demand output ($P_m$) is the post-correction motor critical outputs ($P_{m2},P_{m3},P_{max},P_{min}$) or more ($P_m \geq P_{m2}$ or $P_m \geq P_{max}$; $P_m \geq P_{m3}$ or $P_m \geq P_{min}$), and the vehicle is controlled to travel in the EV mode (stop of the fuel cell) when the motor standard demand output ($P_m$) is less than the post-correction motor critical outputs ($P_{m2},P_{m3},P_{max},P_{min}$) ($P_m<P_{m2}$ or $P_m<P_{max}$; $P_m<P_{m3}$ or $P_m<P_{min}$).

Furthermore, when the default MCU critical output ($P_{mcu1}$) is used as the default critical output, the post-correction MCU critical outputs ($P_{mcu2},P_{mcu3},P_{mcu,max},P_{mcu,min}$) is used by applying the motor output offset (ΔP) value to the default MCU critical output ($P_{mcu1}$), and as a result, by comparing the MCU demand output ($P_{mcu}$) with the post-correction MCU critical outputs ($P_{mcu2},P_{mcu3},P_{mcu,max},P_{mcu,min}$), the vehicle is controlled to travel in the FC mode (restart of the fuel cell) when the MCU demand output ($P_{mcu}$) is the post-correction MCU critical outputs ($P_{mcu2}, P_{mcu3}, P_{mcu,max}, P_{mcu,min}$) or more ($P_{mcu} \geq P_{mcu2}$ or $P_{mcu} \geq P_{mcu,max}$; $P_{mcu} \geq P_{mcu3}$ or $P_{mcu} \geq P_{mcu,min}$), and the vehicle is controlled to travel in the EV mode (stop of the fuel cell) when the MCU demand output ($P_{mcu}$) is less than the post-correction MCU critical outputs ($P_{mcu2}, P_{mcu3}, P_{mcu,max}, P_{mcu,min}$) ($P_{mcu} < P_{mcu2}$ or $P_{mcu} < P_{mcu,max}$; $P_{mcu} < P_{mcu3}$ or $P_{mcu} < P_{mcu,min}$).

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a fuel cell, the method comprising:
    collecting, by a control unit, environmental information and state information of a fuel cell stack, wherein the environmental information includes an outside air temperature and the state information of the fuel cell stack includes a stack operating temperature;
    determining, by the control unit, a motor output offset value from the collected environmental information and the collected state information of the fuel cell stack;
    correcting, by the control unit, a default critical output corresponding to a current vehicle operating state based on the determined motor output offset value;
    determining, by the control unit, stop or restart of the fuel cell by comparing a motor demand output determined from current vehicle operating information with the corrected default critical output;
    controlling, by the control unit, an operating state of the fuel cell to become a state of the determined stop or restart;
    determining, by the control unit, a value of an offset factor according to the outside air temperature;
    determining, by the control unit, a value of an offset factor according to the stack operating temperature; and
    determining, by the control unit, the motor output offset value from the determined value of the offset factor according to the outside air temperature and the determined value of the offset factor according to the stack operating temperature.

2. The method of claim 1, wherein the determining of the offset factor according to the outside air temperature includes:
    determining, by the control unit, a value of a first offset factor according to a current relative humidity in the fuel cell stack, a stack current, and a cell voltage ratio, when the control unit concludes that the outside air temperature is less than a first set temperature; and
    determining, by the control unit, a value of a second offset factor according to the current relative humidity in the fuel cell stack, the stack current, and the cell voltage ratio, when the control unit concludes that the outside air temperature is the first set temperature or higher than the first set temperature.

3. The method of claim 2, wherein in the determining of the value of the first offset factor, the control unit is configured to:
   determine the value of the first offset factor as zero when all of a condition in which a state in which the relative humidity in the fuel cell stack is a first set humidity or more than the first set humidity is maintained for a first set time, a condition in which the stack current exceeds a set current, and a condition in which a state in which the cell voltage ratio is a set ratio value or more than the set ratio value is maintained for a second set time are satisfied, and
   determine the value of the first offset factor as a value corresponding to the cell voltage ratio in an offset map when all of the condition in which the state in which the relative humidity in the fuel cell stack is the first set humidity or more than the first set humidity is maintained for the first set time, the condition in which the stack current exceeds the set current, and a condition in which a state in which the cell voltage ratio is less than the set ratio value is maintained for the second set time are satisfied.

4. The method of claim 3,
   wherein in the determining of the value of the first offset factor, the control unit is configured to determine the value of the first offset factor as zero when one of the condition in which the state in which the relative humidity in the fuel cell stack is the first set humidity or more than the first set humidity is maintained for the first set time and the condition in which the stack current exceeds the set current is not satisfied, or the condition in which the state in which the cell voltage ratio is the set ratio value or more than the set ratio value is maintained for the second set time and the condition in which the state in which the cell voltage ratio is less than the set ratio value is maintained for the second set time are not satisfied.

5. The method of claim 2, wherein the determining of the value of the second offset factor, the control unit is configured to:
   determine the value of the second offset factor as zero when all of a condition in which a state in which the relative humidity in the fuel cell stack is a second set humidity or less than the second set humidity is maintained for a first set time, a condition in which the stack current exceeds a set current, and a condition in which a state in which the cell voltage ratio is a set ratio value or more than the set ratio value is maintained for a second set time are satisfied, and
   determine the value of the second offset factor as a value corresponding to the cell voltage ratio in an offset map when all of the condition in which the state in which the relative humidity in the fuel cell stack is the second set humidity or less than the second set humidity is maintained for the first set time, the condition in which the stack current exceeds the set current, and a condition in which a state in which the cell voltage ratio is less than the set ratio value is maintained for the second set time are satisfied.

6. The method of claim 5,
   wherein in the determining of the value of the second offset factor, the control unit is configured to determine the value of the second offset factor as zero when one of the condition in which the state in which the relative humidity in the fuel cell stack is the second set humidity or less than the second set humidity is maintained for the first set time and the condition in which the stack current exceeds the set current is not satisfied, or the condition in which the state in which the condition in which the state in which the cell voltage ratio is the set ratio value or more than the set ratio value is maintained for the second set time and the condition in which the state in which the cell voltage ratio is less than the set ratio value is maintained for the second set time are not satisfied.

7. The method of claim 2,
   wherein the values of the first offset factor and the second offset factor are determined as zero or map values of an offset map according to the relative humidity in the fuel cell stack, the stack current, and the cell voltage ratio,
   wherein the offset map includes a map in which the value of the first offset factor and the value of the second offset factor are set to values according to the cell voltage ratio, respectively,
   wherein the value of the first offset factor is set to a larger negative value as the cell voltage ratio increases in the offset map, and
   wherein the value of the second offset factor is set to a smaller positive value as the cell voltage ratio increases in the offset map.

8. The method of claim 1,
   wherein the determining of the value of the offset factor according to the stack operating temperature includes:
   determining, by the control unit, a third offset factor according to a current relative humidity in the fuel cell stack, a stack current, and a cell voltage ratio, when the control unit concludes that the stack operating temperature is a second set temperature or higher than the second set temperature; and
   determining, by the control unit, a fourth offset factor according to the current relative humidity in the fuel cell stack, the stack current, and the cell voltage ratio, when the control unit concludes that the stack operating temperature is a third set temperature or less than the third set temperature.

9. The method of claim 8,
   wherein in the determining of the third offset factor, the control unit is configured to:
   determine a value of the third offset factor as zero when all of a condition in which a state in which the relative humidity in the fuel cell stack is a second set humidity or less than the second set humidity is maintained for a first set time, a condition in which the stack current exceeds a set current, and a condition in which a state in which the cell voltage ratio is a set ratio value or more than the set ratio value is maintained for a second set time are satisfied, and
   determine the value of the third offset factor as a value corresponding to the cell voltage ratio in an offset map when all of the condition in which the state in which the relative humidity in the fuel cell stack is the second set humidity or less than the second set humidity is maintained for the first set time, the condition in which the stack current exceeds the set current, and a condition in which a state in which the cell voltage ratio is less than the set ratio value is maintained for the second set time are satisfied.

10. The method of claim 9,
    wherein in the determining of the third offset factor, the control unit is configured to determine the value of the third offset factor as zero when one of the condition in which the state in which the relative humidity in the fuel cell stack is the second set humidity or less than the second set humidity is maintained for the first set time and the condition in which the stack current exceeds the set current is not satisfied, or the condition in which the state in which the condition in which the state in which the cell voltage ratio is the set ratio value or more than the set ratio value is maintained for the second set time and the condition in which the state in which the cell voltage ratio is less than the set ratio value is maintained for the second set time are not satisfied.

11. The method of claim 8, wherein in the determining of the fourth offset factor, the control unit is configured to:
determine a value of the fourth offset factor as zero when all of a condition in which a state in which the relative humidity in the fuel cell stack is a first set humidity or more than the first set humidity is maintained for a first set time, a condition in which the stack current exceeds a set current, and a condition in which a state in which the cell voltage ratio is a set ratio value or more than the set ratio value is maintained for a second set time are satisfied, and
determine the value of the fourth offset factor as a value corresponding to the cell voltage ratio in an offset map when all of the condition in which the state in which the relative humidity in the fuel cell stack is the first set humidity or more than the first set humidity is maintained for the first set time, the condition in which the stack current exceeds the set current, and a condition in which a state in which the cell voltage ratio is less than the set ratio value is maintained for the second set time are satisfied.

12. The method of claim 11,
wherein in the determining of the fourth offset factor, the control unit is configured to determine the value of the fourth offset factor as zero when one of the condition in which the state in which the relative humidity in the fuel cell stack is the first set humidity or more than the first set humidity is maintained for the first set time and the condition in which the state in which the stack current exceeds the set current is not satisfied, or both the condition in which the state in which the condition in which the state in which the cell voltage ratio is greater than or equal to the set ratio value is maintained for the second set time and the condition in which the cell voltage ratio is less than the set ratio value is maintained for the second set time are not satisfied.

13. The method of claim 8,
wherein values of the third offset factor and the fourth offset factor are determined as zero or map values of an offset map according to the relative humidity in the fuel cell stack, the stack current, and the cell voltage ratio,
wherein the offset map includes a map in which the value of the third offset factor and the value of the fourth offset factor are set to values according to the cell voltage ratio, respectively,
wherein the value of the third offset factor is set to a smaller positive value as the cell voltage ratio increases in the offset map, and
wherein the value of the fourth offset factor is set to a larger negative value as the cell voltage ratio increases in the offset map.

14. The method of claim 1,
wherein the control unit is configured to determine a value obtained by summing the value of the offset factor determined according to the outside air temperature and the value of the offset factor determined according to the stack operating temperature as the motor output offset value.

15. The method of claim 1,
wherein in the correcting of the default critical output, the control unit is configured to:
perform a correction that adds the motor output offset value to the default critical output when the motor output offset value is a positive value, and
perform a correction that subtracts an absolute value of the motor output offset value from the default critical output when the motor output offset value is a negative value.

16. The method of claim 1, wherein the determining of the stop or the restart of the fuel cell includes:
determining the restart of the fuel cell when the motor demand output is greater than or equal to the corrected default critical output; and
determining the stop of the fuel cell when the motor demand output is less than the corrected default critical output.

17. The method of claim 16,
wherein a maximum value of the default critical output is preset as a value according to the vehicle operating state in the control unit, and
wherein the determining of the stop or the restart of the fuel cell further includes:
comparing the maximum value of the default critical output with the motor demand output when the corrected default critical output is greater than or equal to the maximum value of the default critical output corresponding to the current vehicle operating state; and
determining the restart of the fuel cell when the motor demand output is greater than or equal to the maximum value of the default critical output, and determining the stop of the fuel cell when the motor demand output is less than the maximum value of the default critical output.

18. A method of controlling a fuel cell, the method comprising:
collecting, by a control unit, environmental information and state information of a fuel cell stack;
determining, by the control unit, a motor output offset value from the collected environmental information and the collected state information of the fuel cell stack;
correcting, by the control unit, a default critical output corresponding to a current vehicle operating state based on the determined motor output offset value; and
determining, by the control unit, stop or restart of the fuel cell by comparing a motor demand output determined from current vehicle operating information with the corrected default critical output; and
controlling, by the control unit, an operating state of the fuel cell to become a state of the determined stop or restart,
wherein the determining of the stop or the restart of the fuel cell includes:
determining the restart of the fuel cell when the motor demand output is greater than or equal to the corrected default critical output; and
determining the stop of the fuel cell when the motor demand output is less than the corrected default critical output, wherein a minimum value of the critical output is preset as a value according to the current vehicle operating state in the control unit, and wherein the determining of the stop or the restart of the fuel cell further includes:
- comparing the minimum value of the critical output with the motor demand output when the corrected critical output is smaller than or equal to the minimum value of the critical output corresponding to the current vehicle operating state; and
- determining the restart of the fuel cell when the motor demand output is greater than or equal to the minimum value of the critical output, and determining the stop of the fuel cell when the motor demand output is less than the minimum value of the critical output.

* * * * *